United States Patent
Zhang et al.

(10) Patent No.: US 11,582,447 B2
(45) Date of Patent: Feb. 14, 2023

(54) SUBPICTURE DEPENDENT SIGNALING IN VIDEO BITSTREAMS

(71) Applicants: Beijing Bytedance Network Technology Co., Ltd., Beijing (CN); Bytedance Inc., Los Angeles, CA (US)

(72) Inventors: Kai Zhang, San Diego, CA (US); Zhipin Deng, Beijing (CN); Hongbin Liu, Beijing (CN); Li Zhang, San Diego, CA (US); Jizheng Xu, San Diego, CA (US)

(73) Assignees: BEIJING BYTEDANCE NETWORK TECHNOLOGY CO., LTD., Beijing (CN); BYTEDANCE INC., Los Angeles, CA (US)

(*) Notice: Subject to any disclaimer, the term of this patent is extended or adjusted under 35 U.S.C. 154(b) by 0 days.

(21) Appl. No.: 17/665,275

(22) Filed: Feb. 4, 2022

(65) Prior Publication Data
US 2022/0166985 A1    May 26, 2022

Related U.S. Application Data

(63) Continuation of application No. PCT/CN2020/108175, filed on Aug. 10, 2020.

(30) Foreign Application Priority Data

Aug. 10, 2019 (WO) ................ PCT/CN2019/100114

(51) Int. Cl.
*H04N 19/105* (2014.01)
*H04N 19/132* (2014.01)
(Continued)

(52) U.S. Cl.
CPC ......... *H04N 19/105* (2014.11); *H04N 19/103* (2014.11); *H04N 19/119* (2014.11);
(Continued)

(58) Field of Classification Search
CPC .......................... H04N 19/157; H04N 19/103
See application file for complete search history.

(56) References Cited

U.S. PATENT DOCUMENTS

| | | | |
|---|---|---|---|
| 6,047,112 | A | 4/2000 | Wise et al. |
| 2004/0008766 | A1 | 1/2004 | Wang et al. |

(Continued)

FOREIGN PATENT DOCUMENTS

| | | | |
|---|---|---|---|
| CN | 1750659 | A | 3/2006 |
| CN | 105144720 | A | 12/2012 |

(Continued)

OTHER PUBLICATIONS

Boyce, Jill, "AHG15: On Interoperability Point Signalling," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0276, 2019.

(Continued)

*Primary Examiner* — Jerry T Jean Baptiste
(74) *Attorney, Agent, or Firm* — Perkins Coie LLP

(57) ABSTRACT

A method of video processing includes performing a conversion between a video unit of a video and a coded representation of the video using at least a video picture. Only one of a sub-picture coding mode or a resolution-changing coding mode is enabled for the video unit. The sub-picture coding mode is a mode in which the video picture is divided into multiple sub-pictures, and the resolution-changing coding mode is a mode in which a resolution of the video picture is adjusted during the conversion.

20 Claims, 20 Drawing Sheets

1200 performing a conversion between a video unit of a video and a coded representation of the video using at least a video picture, where only one of a sub-picture coding mode or a resolution-changing coding mode is enabled for the video unit — 1210

(51) Int. Cl.

| | |
|---|---|
| *H04N 19/176* | (2014.01) |
| *H04N 19/186* | (2014.01) |
| *H04N 19/70* | (2014.01) |
| *H04N 19/103* | (2014.01) |
| *H04N 19/119* | (2014.01) |
| *H04N 19/157* | (2014.01) |
| *H04N 19/167* | (2014.01) |
| *H04N 19/172* | (2014.01) |
| *H04N 19/30* | (2014.01) |
| *H04N 19/169* | (2014.01) |

(52) U.S. Cl.
CPC ......... *H04N 19/132* (2014.11); *H04N 19/157* (2014.11); *H04N 19/167* (2014.11); *H04N 19/172* (2014.11); *H04N 19/176* (2014.11); *H04N 19/186* (2014.11); *H04N 19/1883* (2014.11); *H04N 19/30* (2014.11); *H04N 19/70* (2014.11)

(56) References Cited

U.S. PATENT DOCUMENTS

| | | | |
|---|---|---|---|
| 2004/0177383 | A1 | 9/2004 | Martinolich et al. |
| 2008/0204472 | A1 | 8/2008 | Maertens et al. |
| 2008/0267297 | A1 | 10/2008 | Sampedro et al. |
| 2008/0273597 | A1 | 11/2008 | Kovalenk et al. |
| 2013/0101018 | A1 | 4/2013 | Chong et al. |
| 2013/0101035 | A1 | 4/2013 | Wang et al. |
| 2014/0198844 | A1 | 7/2014 | Hsu et al. |
| 2015/0010091 | A1 | 1/2015 | Hsu et al. |
| 2015/0103924 | A1 | 4/2015 | Misra et al. |
| 2015/0215631 | A1 | 7/2015 | Zhou et al. |
| 2015/0341655 | A1 | 11/2015 | Joshi et al. |
| 2016/0100196 | A1 | 4/2016 | Wu et al. |
| 2016/0234522 | A1 | 8/2016 | Lu et al. |
| 2016/0381385 | A1 | 12/2016 | Ugur |
| 2017/0006304 | A1 | 1/2017 | Miyoshi |
| 2017/0272758 | A1 | 9/2017 | Lin et al. |
| 2017/0289566 | A1 | 10/2017 | He et al. |
| 2018/0091829 | A1 | 3/2018 | Liu et al. |
| 2018/0098090 | A1 | 4/2018 | Lin et al. |
| 2019/0058884 | A1 | 2/2019 | Zhou |
| 2019/0158865 | A1 | 5/2019 | Park et al. |
| 2020/0252619 | A1 | 8/2020 | Zhang et al. |
| 2021/0044818 | A1* | 2/2021 | Furht ............... H04N 19/186 |
| 2021/0044838 | A1 | 2/2021 | Chen et al. |
| 2021/0058637 | A1 | 2/2021 | Zhang et al. |
| 2021/0084295 | A1 | 3/2021 | Chen et al. |
| 2021/0084340 | A1 | 3/2021 | Li et al. |
| 2021/0136407 | A1 | 5/2021 | Aono et al. |
| 2021/0136422 | A1 | 5/2021 | Huang et al. |
| 2021/0235109 | A1 | 7/2021 | Liu et al. |
| 2021/0337228 | A1 | 10/2021 | Wang et al. |
| 2021/0409730 | A1* | 12/2021 | Wang ............... H04N 19/117 |
| 2022/0070442 | A1 | 3/2022 | Jang |
| 2022/0094909 | A1 | 3/2022 | Hannuksela et al. |
| 2022/0132148 | A1* | 4/2022 | Wang ............... H04N 19/159 |
| 2022/0159246 | A1 | 5/2022 | Zhang et al. |
| 2022/0166971 | A1 | 5/2022 | Zhang et al. |
| 2022/0174322 | A1 | 6/2022 | Zhang et al. |
| 2022/0217342 | A1 | 7/2022 | Hannuksela |
| 2022/0239912 | A1 | 7/2022 | Zhang et al. |
| 2022/0239926 | A1 | 7/2022 | Jhu et al. |
| 2022/0248007 | A1 | 8/2022 | Misra et al. |
| 2022/0256146 | A1 | 8/2022 | Zhang et al. |
| 2022/0256148 | A1 | 8/2022 | Zhang et al. |
| 2022/0256195 | A1 | 8/2022 | Zhang et al. |
| 2022/0272332 | A1 | 8/2022 | Lai et al. |
| 2022/0272378 | A1 | 8/2022 | Samuelsson et al. |

FOREIGN PATENT DOCUMENTS

| | | |
|---|---|---|
| CN | 103891292 A | 6/2014 |
| CN | 103891293 A | 6/2014 |
| CN | 103975596 A | 8/2014 |
| CN | 104054347 A | 9/2014 |
| CN | 104702963 A | 6/2015 |
| CN | 104756495 A | 7/2015 |
| CN | 104823449 A | 8/2015 |
| CN | 105393536 A | 3/2016 |
| CN | 106464893 A | 2/2017 |
| CN | 107801039 A | 3/2018 |
| CN | 109076218 A | 12/2018 |
| CN | 109600611 A | 4/2019 |
| CN | 110662036 A | 1/2020 |
| CN | 110677678 A | 1/2020 |
| EP | 3468190 A1 | 4/2019 |
| JP | 6280679 B2 | 2/2018 |
| KR | 1020150057591 A | 5/2015 |
| WO | 2014106692 A1 | 7/2014 |
| WO | 2016100424 A1 | 6/2016 |
| WO | 2016127889 A1 | 6/2016 |
| WO | 2016120468 A1 | 8/2016 |
| WO | 2017083784 A1 | 5/2017 |
| WO | 2017137444 A1 | 8/2017 |
| WO | 2019008174 A1 | 1/2019 |
| WO | 2019073112 A1 | 4/2019 |
| WO | 2020003273 A1 | 1/2020 |

OTHER PUBLICATIONS

Boyce et al. "Sub-Pictures and Sub-Picture Sets with Level Derivation," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0555, 2019.

Bross et al. "Versatile Video Coding (Draft 4)," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M1001, 2019.

Bross et al. "Versatile Video Coding (Draft 6)," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O2001, 2019.

Bross et al. "Versatile Video Coding (Draft 7)," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P2001, 2019.

Chen et al. "AHG17: [SYS-VVC] Signalling Subpicture Coded Video Sequence," Joint Video Experts Team (JVET) of ITU-T SG 16 WP 3 and ISO/IEC JTC 1/SC 29/WG 11 14th Meeting: Geneva, Switzerland, Mar. 19-27, 2019, document JVET-N0073, 2019.

Chen et al. "AHG17/AHG12: On Signalling the Subpicture IDs," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0141, 2019.

Chen et al. "AHG17/AHG12: On Signalling of Subpicture Structure in the SPS," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0143, 2019.

Chen et al. "AHG17/AHG12: On Associating Slices with a Subpicture," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0144, 2019.

Choi et al. "AHG17: On Decoded Picture Buffer Management for VVC," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0154, 2019.

Choi et al. "AHG8/AHG12: On Sub-Picture Partitioning Support with Layers," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0334, 2019.

Choi et al. AHG8/AHG17: On Signaling Reference Picture Resampling, Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0219, 2019.

Fu et al. "CE4-Related: Quadtree-Based Merge Estimation Region for VVC," Joint Video Experts Team (JVET) of ITU-T SG 16 WP

(56) References Cited

OTHER PUBLICATIONS 3 and ISO/IEC JTC 1/SC 29/WG 11 13th Meeting: Marrakech, MA, Jan. 9-18, 2019, document JVET-M0350, 2019.
Gao et al. "Simplified GEO without Multiplication and Minimum Blending Mask Storage (Harmonization of JVET-P0107, JVET-P0264 and JVET-P0304)," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0084, 2019.
Hannuksela et al. "AHG12: On Grouping of Tiles," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0261, 2019.
Hannuksela et al. "AHG12: Summary of HLS Proposals on Subpictures," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0693, 2019.
He et al. "AHG12: On Picture and Sub-Picture Signaling," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0182, 2019.
Misra et al. "Cross-Component Adaptive Loop Filter for Chroma," Joint Video Experts Team (JVET) of ITU-T SG 16 WP 3 and ISO/IEC JTC 1/SC 29/WG 1115th Meeting: Gothenburg, SE, Jul. 3-12, 2019, document JVET-O0636, 2019.
Misra et al. "CE5-related: On the Design of CC-ALF," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P1008, 2019.
Sullivan et al. "Meeting Report of the 15th Meeting of the Joint Video Experts Team (JVET), Gothenburg, SE, Jul. 3-12, 2019," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O2000, 2019.
Wang et al. "AHG12: Sub-Picture-Based Coding for VVC," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0107, 2019.
Wang et al. "AHG12: Harmonized Proposal for Sub-Picture-based Coding for VVC," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0826, 2019.
Wang et al. "AHG12: Sub-Picture Based Motion-Constrained Independent Regions," Joint Video Experts Team (JVET) of ITU-T SG 16 WP 3 and ISO/IEC JTC 1/SC 29/WG 11 15th Meeting: Gothemburg, SE, Jul. 3-12, 2019, document JVET-O0141, 2019.
Wennersten et al. "Encoder-Only GOP-Based Temporal Filter," Joint Collaborative Team on Video Coding (JCT-VC) of ITU-T SG 16 WP 3 and ISO/IEC JTC 1/SC 29/WG 11 35th Meeting: Geneva, CH, Mar. 22-27, 2019, document JCTVC-AI0023, 2019.
Xu et al. "Non-CE8: On IBC Reference Buffer Design," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0472, 2019.
Zhang et al.a "CE4: History-Based Motion Vector Prediction (Test 4.4.7)," Joint Video Experts Team (JVET) of ITU-T SG 16 WP 3 and ISO/IEC JTC 1/SC 29/WG 11 12th Meeting: Macao, CN, Oct. 3-12, 2018, document JVET-L0266, 2018.
Zhang et al. "CE4-Related: Restrictions on History-Based Motion Vector Prediction," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0272, 2019.
Zhu et al. "CE8-related: Palette Mode Coding," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0258, 2019.
http://phenix.it-sudparis.eu/jvet/doc_end_user/current_document.php?id=5755.
https://vcgit.hhi.fraunhofer.de/jvet/VVCSoftware_VTM/tags/VTM-5.0.

International Search Report and Written Opinion from International Patent Application No. PCT/CN2020/108142 dated Oct. 28, 2020 (9 pages).
International Search Report and Written Opinion from International Patent Application No. PCT/CN2020/108159 dated Nov. 12, 2020 (9 pages).
International Search Report and Written Opinion from International Patent Application No. PCT/CN2020/108175 dated Nov. 18, 2020 (10 pages).
International Search Report and Written Opinion from International Patent Application No. PCT/CN2020/108182 dated Nov. 16, 2020 (11 pages).
International Search Report and Written Opinion from International Patent Application No. PCT/CN2020/119931 dated Jan. 12, 2021 (10 pages).
International Search Report and Written Opinion from International Patent Application No. PCT/CN2020/119932 dated Dec. 30, 2020 (9 pages).
International Search Report and Written Opinion from International Patent Application No. PCT/CN2020/121767 dated Jan. 27, 2021 (12 pages).
International Search Report and Written Opinion from International Patent Application No. PCT/CN2020/121768 dated Jan. 8, 2021 (13 pages).
International Search Report and Written Opinion from International Patent Application No. PCT/CN2020/139389 dated Mar. 24, 2021 (9 pages).
International Search Report and Written Opinion from International Patent Application No. PCT/CN2021/071008 dated Apr. 12, 2021 (13 pages).
International Search Report and Written Opinion from International Patent Application No. PCT/CN2021/071360 dated Apr. 18, 2021 (10 pages).
Non Final Office Action from U.S. Appl. No. 17/665,242 dated Apr. 15, 2022.
Non Final Office Action from U.S. Appl. No. 17/723,089 dated Aug. 1, 2022.
Examination Report from Indian Patent Application No. 202247007118 dated Jul. 6, 2022 (7 pages).
Non Final Office Action from U.S. Appl. No. 17/665,220 dated May 24, 2022.
Non Final Office Action from U.S. Appl. No. 17/711,294 dated Jun. 7, 2022.
Non Final Office Action from U.S. Appl. No. 17/711,319 dated Jun. 8, 2022.
Chen et al. "AHG8: Adaptive Resolution Change," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0303, 2019.
Chen et al. "AHG8: Integrated Specification Text for Reference Picture Resampling," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O1164, 2019.
Fan et al. "CE6-2.3-Related: Reduced 8+8 Matrices for LFNST," Joint Video Experts Team (JVET) of ITU-T SG 16 NP 3 and ISO/IEC JTC 1/SC 29/WG 11 16th Meeting: Geneva, CH, Oct. 1-11, 2019, document JVET-P0545, 2019.
Hendry et al. "HG8: Support for Reference Picture Resampling—Handling of Picture Size Signalling, Conformance Windows, and DPB Management," Joint Video Experts Team (JVET) of ITU-T SG 16 WP 3 and ISO/IEC JTC 1/SC 29/NG 11 15th Meeting: Gothernburg, SE, Jul. 3-12, 2019, document JVET-O0133, 2019.
Hsiang et al. "AHG9/AHG12: Modifications Related to Subpicture Signalling and RPR," Joint Video Experts Team (JVET) of ITU-T Sg 16 WP3 and ISO/IEC JTC 1/SC 29/WG 11 17th Meeting Brussels, BE, Jan. 7-17, 2020, document JVET-Q0290, 2020.
Nishi et al. "AHG9: Constraint About Usage of Reference Picture Resampling and Subpictures," Joint Video Experts Team (JVET) of ITU-T SG 16 WP3 and ISO/IEC JTC 1/SC 29/WG 11 17th Meeting Brussels, BE, Jan. 7-17, 2020, document JVET-Q0043, 2020.
Samuelsson et al. "AHG 8: Adaptive Resolution Change (ARC) High-Level Syntax (HLS)," Joint Video Experts Team (JVET) of

(56) References Cited

OTHER PUBLICATIONS

ITU-T SG 16 WP 3 and ISO/IEC JTC 1/SC 29/WG 11 15th Meeting, Gothenburg, SE Jul. 3-12, 2019, document JVET-O0204, 2019.
Suehring et al. "AHG9: Subpicture Location Signalling Bugfix," Joint Experts Team (JVET) of ITU-T SG 16 WP 3 and ISO/IEC JTC 1/SC 29/WG 11 17th Meeting, Brussels, BE, Jan. 7-17, 2020, document JVET-Q0787,2020.
Sullivan et al. "Meeting Report of the 17th Meeting of the Joint Video Experts Team (JVRT), Brussels, BE, Jan. 7-17, 2020," Joint Video Experts Team (JVET) of ITU-T SG 16 WP 3 and ISO/IEC JTC 1/SC 29/WG 11 17th Meeting, Brussels, BE Jan. 7-17, 2020, document JVET-Q2000, 2020.
Wang et al. "AHG12: A Summary of Proposals on Subpicture ID Signalling," Joint Video Experts Team (JVET) of ITU-T SG 16 WP 3 and iSO/IEC Jtc 1/SC 29/WG 11 17th Meeting, Brussels, BE Jan. 7-17, 2020, document JVET-O0590, 2020.
Extended European Search Report from European Patent Application No. 20852929.7 dated Sep. 26, 2022 (15 pages).
Extended European Search Report from European Patent Application No. 20871705.8 dated Oct. 31, 2022 (10 pages).
Extended European Search Report from European Patent Application No. 20876854.9 dated Oct. 31, 2022 (13 pages).
Examination Report from Indian Patent Application No. 202247022804 dated Sep. 8, 2022 (6 pages).
Examination Report from Indian Patent Application No. 202247023112 dated Aug. 18, 2022 (6 pages).
Examination Report from Indian Patent Application No. 202247039697 dated Oct. 12, 2022 (7 pages).
Senanayake et al. "High Performance Hardware Architectures for Intra Block Copy and Palette Coding for HEVC Screen Content Coding Extension," 2017 IEEE, 978-1-5090-4825-0/17/$31.00.
Notice of Allowance from U.S. Appl. No. 17/665,220 dated Sep. 29, 2022.
Non Final Office Action from U.S. Appl. No. 17/723,175 dated Oct. 12, 2022.
Non Final Office Action from U.S. Appl. No. 17/861,728 dated Sep. 26, 2022.

* cited by examiner

SUBPICTURE DEPENDENT SIGNALING IN VIDEO BITSTREAMS

CROSS REFERENCE TO RELATED APPLICATIONS

This application is a continuation of International Patent Application No. PCT/CN2020/108175, filed on Aug. 10, 2020, which claims the priority to and benefits of International Patent Application No. PCT/CN2019/100114, filed on Aug. 10, 2019. All the aforementioned patent applications are hereby incorporated by reference in their entireties.

TECHNICAL FIELD

This document is related to video and image coding and decoding technologies.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The disclosed techniques may be used by video or image decoder or encoder embodiments for in which sub-picture based coding or decoding is performed.

In one example aspect a method of video processing is disclosed. The method includes determining, for a conversion between a current block of a first picture of a video and a bitstream representation of the video, a motion candidate based on motion information from a second picture according to a rule. The rule specifies that a position from which the motion information is accessed is constrained to be within a specific subpicture of the second picture. The method also includes performing the conversion based on the determining.

In another example aspect a method of video processing is disclosed. The method includes determining, for a conversion of a current block of a first picture of a video and a bitstream representation of the video, an integer sample from a second picture according to a rule. The second picture comprises a reference picture that is not used in an interpolation process. The rule specifies that a position from which the integer sample is accessed is constrained to be within a specific subpicture of the second picture. The method also includes performing the conversion based on the determining.

In another example aspect a method of video processing is disclosed. The method includes determining, for a conversion of a current block of a video and a bitstream representation of the video, a position at which a reconstructed luma sample is accessed according to a rule. The rule specifies that the position is constrained to be within a specific subpicture of a video picture. The method also includes performing the conversion based on the determining.

In another example aspect a method of video processing is disclosed. The method includes determining, for a conversion of a current block of a video and a bitstream representation of the video, a position at which a picture boundary check is performed according to a rule. The rule specifies that the position is constrained to be within a specific subpicture of a video picture. The method also includes performing the conversion based on the determining.

In another example aspect a method of video processing is disclosed. The method includes resetting, after a conversion of a sub-picture of a video picture of a video and a bitstream representation of the video, a table of motion candidates derived based on past conversions and performing a conversion of a subsequent sub-picture of the video picture and the bitstream representation using the table after the resetting.

In another example aspect a method of video processing is disclosed. The method includes performing a conversion between a video comprising a video picture that includes multiple sub-pictures and multiple video blocks and a coded representation of the video according to a rule. The rule specifies that a boundary between any two sub-pictures is also a boundary between two video blocks. A video block in the video picture is covered by a single subpicture of the video picture.

In another example aspect a method of video processing is disclosed. The method includes performing a conversion between a video unit of a video and a coded representation of the video using at least a video picture, where only one of a sub-picture coding mode or a resolution-changing coding mode is enabled for the video unit. The sub-picture coding mode is a mode in which the video picture is divided into multiple sub-pictures, and the resolution-changing coding mode is a mode in which a resolution of the video picture is adjusted during the conversion.

In another example aspect a method of video processing is disclosed. The method includes performing a conversion between a video unit of a video and a coded representation of the video using at least a video picture, where both a sub-picture coding mode and a resolution-changing coding mode are enabled for the video unit. The sub-picture coding mode is a mode in which the video picture is divided into multiple sub-pictures, and the resolution-changing coding mode is a mode in which a resolution of the video picture is adjusted during the conversion.

In another example aspect a method of video processing is disclosed. The method includes performing a conversion between a video comprising one or more video pictures and a coded representation of the video, where a dimension of an individual video picture is constrained to be greater than or equal to 8. In some embodiments, the dimension is a width of the individual video picture.

In another example aspect a method of video processing is disclosed. The method includes performing a conversion between a video picture of a video and a coded representation of the video according to a rule. The video picture comprises at least one sub-picture, and the rule specifies that a characteristic of a sub-picture is represented as at lease one syntax element in the coded representation, the at least one syntax element being different than an index value of the sub-picture grid in the video picture.

In another example aspect a method of video processing is disclosed. The method includes performing a conversion between a video picture of a video and a coded representation of the video according to a rule. The video picture comprises multiple sub-pictures, each sub-picture comprising multiple elements. The rule specifies that a dimension of individual elements in a sub-picture satisfies a constraint.

In another example aspect a method of video processing is disclosed. The method includes performing a conversion between a video comprising a picture that includes multiple sub-pictures and a coded representation of the video using a coding mode according to a rule. The rule specifies that certain stored information about a previous sub-picture is reset prior to processing each next sub-picture of the multiple sub-pictures.

In another example aspect a method of video processing is disclosed. The method includes performing a temporal filtering operation in a conversion between a video and a coded representation of the video according to a rule. The video comprises multiple video pictures, each comprising multiple sub-pictures. The rule specifies that, for a temporal filtering a current sample in a current sub-picture of a video picture, only samples within the same current sub-picture or a sub-picture in a different video picture corresponding to the current sub-picture are available.

In another example aspect a method of video processing is disclosed. The method includes determining, for a conversion between a block in a video picture of a video and a coded representation of the video, a manner of applying a partitioning method to the block based on whether the block crosses one or more sub-picture boundaries of the video picture. The method also includes performing the conversion based on the determining.

In another example aspect a method of video processing is disclosed. The method includes fora conversion between a video picture of a video and a coded representation of the video, two sub-regions of the video picture. A first sub-region comprises multiple sub-pictures of the video picture and a second sub-region comprises remaining samples in the video picture. The method also includes performing the conversion based on the determining.

In another example aspect a method of video processing is disclosed. The method includes determining, for a video block in a first video region of a video, whether a position at which a temporal motion vector predictor is determined for a conversion between the video block and a bitstream representation of the current video block using an affine mode is within a second video region; and performing the conversion based on the determining.

In another example aspect, another method of video processing is disclosed. The method includes determining, for a video block in a first video region of a video, whether a position at which an integer sample in a reference picture is fetched for a conversion between the video block and a bitstream representation of the current video block is within a second video region, wherein the reference picture is not used in an interpolation process during the conversion; and performing the conversion based on the determining.

In another example aspect, another method of video processing is disclosed. The method includes determining, for a video block in a first video region of a video, whether a position at which a reconstructed luma sample value is fetched for a conversion between the video block and a bitstream representation of the current video block is within a second video region; and performing the conversion based on the determining.

In another example aspect, another method of video processing is disclosed. The method includes determining, for a video block in a first video region of a video, whether a position at which a check regarding splitting, depth derivation or split flag signaling for the video block is performed during a conversion between the video block and a bitstream representation of the current video block is within a second video region; and performing the conversion based on the determining.

In another example aspect, another method of video processing is disclosed. The method includes performing a conversion between a video comprising one or more video pictures comprising one or more video blocks, and a coded representation of the video, wherein the coded representation complies with a coding syntax requirement that the conversion is not to use sub-picture coding/decoding and a dynamic resolution conversion coding/decoding tool or a reference picture resampling tool within a video unit.

In another example aspect, another method of video processing is disclosed. The method includes performing a conversion between a video comprising one or more video pictures comprising one or more video blocks, and a coded representation of the video, wherein the coded representation complies with a coding syntax requirement that a first syntax element subpic_grid_idx[i][j] is not larger than a second syntax element max_subpics_minus1.

In yet another example aspect, the above-described method may be implemented by a video encoder apparatus that comprises a processor.

In yet another example aspect, the above-described method may be implemented by a video decoder apparatus that comprises a processor.

In yet another example aspect, these methods may be embodied in the form of processor-executable instructions and stored on a computer-readable program medium.

These, and other, aspects are further described in the present document.

DETAILED DESCRIPTION

The present document provides various techniques that can be used by a decoder of image or video bitstreams to improve the quality of decompressed or decoded digital video or images. For brevity, the term "video" is used herein to include both a sequence of pictures (traditionally called video) and individual images. Furthermore, a video encoder may also implement these techniques during the process of encoding in order to reconstruct decoded frames used for further encoding.

Section headings are used in the present document for ease of understanding and do not limit the embodiments and techniques to the corresponding sections. As such, embodiments from one section can be combined with embodiments from other sections.

1. Summary

This document is related to video coding technologies. Specifically, it is related to palette coding with employing base colors based representation in video coding. It may be applied to the existing video coding standard like HEVC, or the standard (Versatile Video Coding) to be finalized. It may be also applicable to future video coding standards or video codec.

2. Initial Discussion

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards [1,2]. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

2.1 The Region Constraint in TMVP and Sub-Block TMVP in VVC

Figure 1:
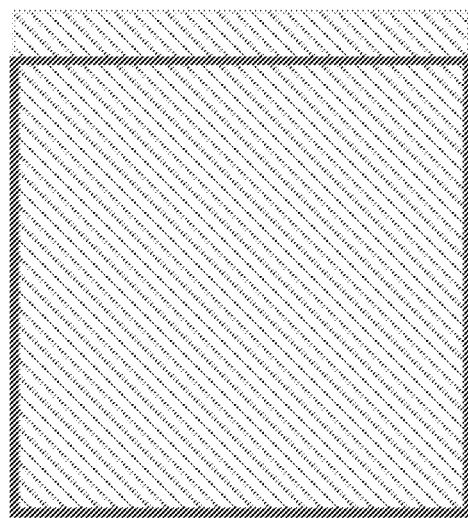
FIG. 1 shows an example of region constraint in temporal motion vector prediction (TMVP) and sub-block TMVP.

FIG. 1 illustrates example region constraint in TMVP and sub-block TMVP. In TMVP and sub-block TMVP, it is constrained that a temporal MV can only be fetched from the collocated CTU plus a column of 4×4 blocks as shown in FIG. 1.

2.2 Example Sub-Picture

In some embodiments, sub-picture-based coding techniques based on flexible tiling approach can be implemented. Summary of the sub-picture-based coding techniques includes the following:

(1) Pictures can be divided into sub-pictures.

(2) The indication of existence of sub-pictures is indicated in the SPS, along with other sequence-level information of sub-pictures.

(3) Whether a sub-picture is treated as a picture in the decoding process (excluding in-loop filtering operations) can be controlled by the bitstream.

(4) Whether in-loop filtering across sub-picture boundaries is disabled can be controlled by the bitstream for each sub-picture. The DBF, SAO, and ALF processes are updated for controlling of in-loop filtering operations across sub-picture boundaries.

(5) For simplicity, as a starting point, the sub-picture width, height, horizontal offset, and vertical offset are signaled in units of luma samples in SPS. Sub-picture boundaries are constrained to be slice boundaries.

(6) Treating a sub-picture as a picture in the decoding process (excluding in-loop filtering operations) is specified by slightly updating the coding_tree_unit( ) syntax, and updates to the following decoding processes:

The derivation process for (advanced) temporal luma motion vector prediction

The luma sample bilinear interpolation process

The luma sample 8-tap interpolation filtering process

The chroma sample interpolation process (7) Sub-picture IDs are explicitly specified in the SPS and included in the tile group headers to enable extraction of sub-picture sequences without the need of changing VCL NAL units.

(8) Output sub-picture sets (OSPS) are proposed to specify normative extraction and conformance points for sub-pictures and sets thereof.

2.3 Example Sub-Pictures in Versatile Video Coding

Sequence Parameter Set RBSP Syntax

| seq_parameter_set_rbsp( ) { | Descriptor |
| --- | --- |
| sps_decoding_parameter_ set_id | u(4) |
| sps_video_parameter_set_id | u(4) |
| ... | |
| pic_width_max_in_luma_samples | ue(v) |
| pic_height_max_in_luma_samples | ue(v) |
| subpics_present_flag | u(1) |
| if( subpics_present_flag) { | |
| max_subpics_minus 1 | u(8) |
| subpic_grid_col_width_minus 1 | u(v) |
| subpic_grid_row_height_minus 1 | u(v) |
| for( i =0; 1<NumSubPicGridRows; i++) | |
| for( j =0;j <NumSubPicGridCols; j++) | |
| subpic_grid_idx i++j | u(v) |
| for( i =0; i <=NumSubPics; i++30) { | |
| subpic_treated_as_pic_flag+ i | u(1) |
| loop_filter_across_subpic_enabled_flag+ i | u(1) |
| } | |
| } | |
| ... | |
| { | | subpics_present_flag equal to 1 indicates that subpicture parameters are present in the present in the SPS RBSP syntax. subpics_present_flag equal to 0 indicates that subpicture parameters are not present in the present in the SPS RBSP syntax.

NOTE 2—When a bitstream is the result of a sub-bitstream extraction process and contains only a subset of the subpictures of the input bitstream to the sub-bitstream extraction process, it might be required to set the value of subpics_present_flag equal to 1 in the RBSP of the SPSs.

max_subpics_minus1 plus 1 specifies the maximum number of subpictures that may be present in the CVS. max_subpics_minus1 shall be in the range of 0 to 254. The value of 255 is reserved for future use by ITU-T|ISO/IEC.

subpic_grid_col_width_minus1 plus 1 specifies the width of each element of the subpicture identifier grid in units of 4 samples. The length of the syntax element is Ceil(Log 2(pic_width_max_in_luma_samples/4)) bits.

The variable NumSubPicGridCols is derived as follows:

NumSubPicGridCols=(pic_width_max_in_luma_samples+subpic_grid_col_width_minus1*4+3)/(subpic_grid_col_width_minus1*4+4)  (7-5)

subpic_grid_row_height_minus1 plus 1 specifies the height of each element of the subpicture identifier grid in units of 4 samples. The length of the syntax element is Ceil(Log 2(pic_height_max_in_luma_samples/4)) bits.

The variable NumSubPicGridRows is derived as follows:

NumSubPicGridRows=(pic_height_max_in_luma_samples+subpic_grid_row_height_minus1*4+3)/(subpic_grid_row_height_minus1*4+4)  (7-6)

subpic_grid_idx[i][j] specifies the subpicture index of the grid position (i, j). The length of the syntax element is Ceil(Log 2(max_subpics_minus1+1)) bits.

The variables SubPicTop[subpic_grid_idx[i][j]], SubPicLeft[subpic_grid_idx[i][j]], SubPicWidth[subpic_grid_idx[i][j]], SubPicHeight[subpic_grid_idx[i][j]], and NumSubPics are derived as follows:

subpic_treated_as_pic_flag[i] equal to 1 specifies that the i-th subpicture of each coded picture in the CVS is treated as a picture in the decoding process excluding in-loop filtering operations. subpic_treated_as_pic_flag[i] equal to 0 specifies that the i-th subpicture of each coded picture in the CVS is not treated as a picture in the decoding process excluding in-loop filtering operations. When not present, the value of subpic_treated_as_pic_flag[i] is inferred to be equal to 0.

loop_filter_across_subpic_enabled_flag[i] equal to 1 specifies that in-loop filtering operations may be performed across the boundaries of the i-th subpicture in each coded picture in the CVS.

loop_filter_across_subpic_enabled_flag[i] equal to 0 specifies that in-loop filtering operations are not performed across the boundaries of the i-th subpicture in each coded picture in the CVS. When not present, the value of loop_filter_across_subpic_enabled_pic_flag[i] is inferred to be equal to 1.

It is a requirement of bitstream conformance that the following constraints apply:

For any two subpictures subpicA and subpicB, when the index of subpicA is less than the index of subpicB, any coded NAL unit of subPicA shall succeed any coded NAL unit of subPicB in decoding order.

The shapes of the subpictures shall be such that each subpicture, when decoded, shall have its entire left boundary and entire top boundary consisting of picture boundaries or consisting of boundaries of previously decoded subpictures.

The list CtbToSubPicIdx[ctbAddrRs] for ctbAddrRs ranging from 0 to PicSizeInCtbsY−1, inclusive, specifying the conversion from a CTB address in picture raster scan to a subpicture index, is derived as follows:

```
NumSubPics = 0
for( i = 0; i. < NumSubPicGridRows; i++ ) {
  for(j = 0; j < NumSubPicGridCols; j++ ) {
    if ( i = = 0)
      SubPicTop[ subpic_grid_idx[ i ][ j ] ] = 0
      else if( subpic_grid_idx[ i ] [ j ]      !=      subpic_grid_idx[i− 1 ][ j ] ) {
        SubPicTop[ subpic_grid_idx[ i ][ j ] ] = i
    SubPicHeight[ subpic_grid_idx[i− 1][ j ] ]    =    i − SubPicTop[ subpic_grid_idx[i− 1 ][ j ] ]
    }
    if (j = = 0)
      SubPicLeft[ subpic_grid_idx[ i ][j ] ] = 0
      else if (subpic_grid_idx [ i ][j ] != subpic_grid_idx [ i ][j − 1 ] ) {
        SubPicLeft[ subpic_grid_idx[ i ][ j ] ] = j
    SubPicWidth[ subpic_grid_idx[ i ][ j ] ] = j − SubPicLeft[ subpic_grid_idx[ i ][ j − 1 ] ]
    }
    if ( i = = NumSubPicGridRows − 1)
    SubPicHeight[ subpic_grid_idx [ i ][ j ] ] = i − SubPicTop[ subpic_grid_idx[ i − 1 ][ j ] ] + 1
    if (j = = NumSubPicGridRows − 1)
    SubPicWidth[ subpic_grid_idx[ i ][ j ] ]    =    j − SubPicLeft[ subpic_grid_idx[ i ][ j − 1 ] ] + 1
    if( subpic_grid_idx[ i ][ j ] > NumSubPics)
      NumSubPics = subpic_grid_idx[ i ] [j ]
  }
}
```

```
for( ctbAddrRs = 0; ctbAddrRs < PicSizeInCtbsY; ctbAddrRs++ ) {
    posX = ctbAddrRs % PicWidthInCtbsY * CtbSizeY
    posY = ctbAddrRs / PicWidthInCtbsY * Ctb SizeY
    Ctb To SubPicIdx[ ctbAddrRs ] = -1
    for( i = 0; CtbToSubPicIdx[ ctbAddrRs ] < 0 && i < NumSubPics; i++ ) {
        if( ( posX >= SubPicLeft[ i ] * ( subpic_grid_col_width_minus1 + 1 ) * 4 ) &&
            ( posX < ( SubPicLeft[ i ] + SubPicWidth[ i ] ) *
                ( subpic_grid_col_width_minus1 + 1) * 4 ) &&
            ( posY >= SubPicTop[ i ]*
                ( subpic_grid_row_height_minus1 + 1) * 4 ) &&
            ( posY < SubPicTop[ i ] + SubPicHeight[ i ] ) *
                ( subpic_grid_row_height_minus1 +1 ) * 4 ) )
            CtbToSubPicIdx[ ctbAddrRs ] = i
    }
}
``` num_bricks_in_slice_minus1, when present, specifies the number of bricks in the slice minus 1. The value of num_bricks_in_slice_minus1 shall be in the range of 0 to NumBricksInPic−1, inclusive. When rect_slice_flag is equal to 0 and single_brick_per_slice_flag is equal to 1, the value of num_bricks_in_slice_minus1 is inferred to be equal to 0. When single_brick_per_slice_flag is equal to 1, the value of num_bricks_in_slice_minus1 is inferred to be equal to 0.

The variable NumBricksInCurrSlice, which specifies the number of bricks in the current slice, and SliceBrickIdx [i], which specifies the brick index of the i-th brick in the current slice, are derived as follows:

```
if(     rect_slice_flag     )   {
    sliceIdx          =          0
    while(   slice_address   !=   slice_id[sliceIdx]   )
        sliceIdx++
    NumBricksInCurrSlice      =      NumBricksInSlice [ sliceIdx ]
    brickIdx          =          TopLeftBrickIdx[sliceIdx]
    for( bIdx = 0; brickIdx <= BottomRightBrickIdx [ sliceIdx ];
        brickIdx++ )                               (7-92)
        if(   BricksToSliceMap[brickIdx]   ==   sliceIdx   )
            SliceBrickIdx[bIdx++]     =     brickIdx
}    else    {
    NumBricksInCurrSlice      =      num_bricks_in_slice_minus1 + 1
    SliceBrickIdx[0]       =       slice_address
    for(   i   =   1;   i   <   NumBricksInCurrSlice;   i++   )
        SliceBrickIdx[i]     =     SliceBrickIdx [i- 1 ]    +    1
}
```

The variables SubPicIdx, SubPicLeftBoundaryPos, SubPicTopBoundaryPos, SubPicRightBoundaryPos, and SubPicBotBoundaryPos are derived as follows:

```
SubPicIdx=CtbToSubPicIdx[ CtbAddrBsToRs[ FirstCtbAddrBs[ SliceBrickIdx[ 0 ] ] ] ]
if( subpic_treated_as_pic_flag[ SubPicIdx ] ) {
SubPicLeftBoundaryPos=SubPicLeft[ SubPicIdx ] * ( subpic_grid_col_width_minus1 + 1) * 4
SubPicRightBoundaryPos       =       ( SubPicLeft[ SubPicIdx ] + SubPicWidth[ SubPicIdx ] ) *
    ( subpic_grid_col_width_minus1 +1) * 4
SubPicTopBoundaryPos      =      SubPicTop[ SubPicIdx ] * ( subpic_grid_row_height_minus1 + 1 )* 4
SubPicBotBoundaryPos            =            ( SubPicTop[ SubPicIdx ] + SubPicHeight[ SubPicIdx ] ) *
    ( subpic_grid_row_height_minus1 +1) * 4
}
...
```

Derivation Process for Temporal Luma Motion Vector Prediction

Inputs to this process are:

a luma location (xCb, yCb) of the top-left sample of the current luma coding block relative to the top-left luma sample of the current picture, a variable cbWidth specifying the width of the current coding block in luma samples, a variable cbHeight specifying the height of the current coding block in luma samples, a reference index refIdxLX, with X being 0 or 1.

Outputs of this process are:

the motion vector prediction mvLXCol in 1/16 fractional-sample accuracy, the availability flag availableFlagLXCol.

The variable currCb specifies the current luma coding block at luma location (xCb, yCb).

The variables mvLXCol and availableFlagLXCol are derived as follows:

If slice_temporal_mvp_enabled_flag is equal to 0 or (cbWidth*cbHeight) is less than or equal to 32, both components of mvLXCol are set equal to 0 and availableFlagLXCol is set equal to 0.

Otherwise (slice_temporal_mvp_enabled_flag is equal to 1), the following ordered steps apply:

1. The bottom right collocated motion vector and the bottom and right boundary sample locations are derived as follows:

$$xColBr = xCb + cbWidth \qquad (8\text{-}421)$$

$$yColBr = yCb + cbHeight \qquad (8\text{-}422)$$

rightBoundaryPos=subpic_treated_as_pic_flag[SubPicIdx]? SubPicRightBoundaryPos: pic_width_in_luma_samples−1 (8-423)

botBoundaryPos=subpic_treated_as_pic_flag[SubPicIdx]? SubPicBotBoundaryPos: pic_height_in_luma_samples−1

If yCb»CtbLog 2SizeY is equal to yColBr»CtbLog 2SizeY, yColBr is less than or equal to botBoundaryPos and xColBr is less than or equal to rightBoundaryPos, the following applies:

The variable colCb specifies the luma coding block covering the modified location given by ((xColBr»3)«3, (yColBr»3)«3) inside the collocated picture specified by ColPic.

The luma location (xColCb, yColCb) is set equal to the top-left sample of the collocated luma coding block specified by colCb relative to the top-left luma sample of the collocated picture specified by ColPic.

The derivation process for collocated motion vectors as specified in clause 8.5.2.12 is invoked with currCb, colCb, (xColCb, yColCb), refIdxLX and sbFlag set equal to 0 as inputs, and the output is assigned to mvLXCol and availableFlagLXCol.

Otherwise, both components of mvLXCol are set equal to 0 and availableFlagLXCol is set equal to 0.

. . .

Luma Sample Bilinear Interpolation Process
Inputs to this process are:
a luma location in full-sample units (xInt$_L$, yInt$_L$),
a luma location in fractional-sample units (xFrac$_L$, yFrac$_L$),
the luma reference sample array refPicLX$_L$.
Output of this process is a predicted luma sample value predSampleLX$_L$
The variables shift1, shift2, shift3, shift4, offset1, offset2 and offset3 are derived as follows:

$$\text{shift1}=\text{BitDepth}_Y-6 \quad (8\text{-}453)$$

$$\text{offset1}=1\ll(\text{shift1}-1) \quad (8\text{-}454)$$

$$\text{shift2}=4 \quad (8\text{-}455)$$

$$\text{offset2}=1\ll(\text{shift2}-1) \quad (8\text{-}456)$$

$$\text{shift3}=10-\text{BitDepth}_Y \quad (8\text{-}457)$$

$$\text{shift4}=\text{BitDepth}_Y-10 \quad (8\text{-}458)$$

$$\text{offset4}=1\ll(\text{shift4}-1) \quad (8\text{-}459)$$

The variable picW is set equal to pic_width_in_luma_samples and the variable picH is set equal to pic_height_in_luma_samples.

The luma interpolation filter coefficients fb$_L$[p] for each 1/16 fractional sample position p equal to xFrac$_L$ or yFrac$_L$ are specified in Table 8-10.

The luma locations in full-sample units (xInt$_i$, yInt$_i$) are derived as follows for i=0 . . . 1:

If subpic_treated_as_pic_flag[SubPicIdx] is equal to 1, the following applies:

$$x\text{Int}_i=\text{Clip3}(\text{SubPicLeftBoundaryPos},\text{SubPicRightBoundaryPos},x\text{Int}_L+i) \quad (8\text{-}460)$$

$$y\text{Int}_i=\text{Clip3}(\text{SubPicTopBoundaryPos},\text{SubPicBotBoundaryPos},y\text{Int}_L+i) \quad (8\text{-}461)$$

Otherwise (subpic_treated_as_pic_flag[SubPicIdx] is equal to 0), the following applies:

$$x\text{Int}_i=\text{Clip3}(0,\text{pic}W-1,\text{sps\_ref\_wraparound\_enabled\_flag? Clip}H((\text{sps\_ref\_wraparound\_offset\_minus1}+1)*\text{MinCbSize}Y,\text{pic}W,(x\text{Int}_L+i)): x\text{Int}_L+i) \quad (8\text{-}462)$$

$$y\text{Int}_i=\text{Clip3}(0,\text{pic}H-1,y\text{Int}_L+i) \quad (8\text{-}463)$$

. . .

Derivation Process for Subblock-Based Temporal Merging Candidates
Inputs to this process are:
a luma location (xCb, yCb) of the top-left sample of the current luma coding block relative to the top-left luma sample of the current picture,
a variable cbWidth specifying the width of the current coding block in luma samples,
a variable cbHeight specifying the height of the current coding block in luma samples,
the availability flag availableFlagA$_1$ of the neighbouring coding unit,
the reference index refIdxLXA$_1$ of the neighbouring coding unit with X being 0 or 1,
the prediction list utilization flag predFlagLXA$_1$ of the neighbouring coding unit with X being 0 or 1,
the motion vector in 1/16 functional-sample accuracy mvLXA$_1$ of the neighbouring coding unit with X being 0 or 1.

Outputs of this process are:
the availability flag availableFlagSbCol,
the number of luma coding subblocks in horizontal direction numSbX and in vertical direction numSbY,
the reference indices refIdxL0SbCol and refIdxL1SbCol,
the luma motion vectors in 1/16 fractional-sample accuracy mvL0SbCol[xSbIdx][ySbIdx] and mvL1SbCol[xSbIdx][ySbIdx] with xSbIdx=0 . . . numSbX−1, ySbIdx=0 . . . numSbY−1,
the prediction list utilization flags predFlagL0SbCol[xSbIdx][ySbIdx] and predFlagL1SbCol[xSbIdx][ySbIdx] with xSbIdx=0 . . . numSbX−1, ySbIdx=0 . . . numSbY−1.

The availability flag availableFlagSbCol is derived as follows.

If one or more of the following conditions is true, availableFlagSbCol is set equal to 0.
slice_temporal_mvp_enabled_flag is equal to 0.
sps_sbtmvp_enabled_flag is equal to 0.
cbWidth is less than 8.
cbHeight is less than 8.

Otherwise, the following ordered steps apply:
1. The location (xCtb, yCtb) of the top-left sample of the luma coding tree block that contains the current coding block and the location (xCtr, yCtr) of the below-right center sample of the current luma coding block are derived as follows:

$$x\text{Ctb}=(x\text{Cb}\gg\text{CtuLog 2Size})\ll\text{CtuLog 2Size} \quad (8\text{-}542)$$

$$y\text{Ctb}=(y\text{Cb}\gg\text{CtuLog 2Size})\ll\text{CtuLog 2Size} \quad (8\text{-}543)$$

$$x\text{Ctr}=x\text{Cb}+(\text{cbWidth}/2) \quad (8\text{-}544)$$

$$y\text{Ctr}=y\text{Cb}+(\text{cbHeight}/2) \quad (8\text{-}545)$$

2. The luma location (xColCtrCb, yColCtrCb) is set equal to the top-left sample of the collocated luma coding block covering the location given by (xCtr, yCtr) inside ColPic relative to the top-left luma sample of the collocated picture specified by ColPic.

3. The derivation process for subblock-based temporal merging base motion data as specified in clause 8.5.5.4 is invoked with the location (xCtb, yCtb), the location (xColCtrCb, yColCtrCb), the availability flag availableFlagA$_1$, and the prediction list utilization flag predFlagLXA$_1$, and the reference index refIdxLXA$_1$, and the motion vector mvLXA$_1$, with X being 0 and 1 as inputs and the motion vectors ctrMvLX, and the prediction list utilization flags ctrPredFlagLX of the collocated block, with X being 0 and 1, and the temporal motion vector tempMv as outputs.

4. The variable availableFlagSbCol is derived as follows:
If both ctrPredFlagL0 and ctrPredFlagL1 are equal to 0, availableFlagSbCol is set equal to 0.
Otherwise, availableFlagSbCol is set equal to 1.

When availableFlagSbCol is equal to 1, the following applies:
The variables numSbX, numSbY, sbWidth, sbHeight and refIdxLXSbCol are derived as follows:

numSbX=cbWidth»3 (8-546)

numSbY=cbHeight»3 (8-547)

sbWidth=cbWidth/numSbX (8-548)

sbHeight=cbHeight/numSbY (8-549)

refIdxLXSbCol=0 (8-550)

For xSbIdx=0 . . . numSbX−1 and ySbIdx=0 . . . numSbY−1, the motion vectors mvLXSbCol[xSbIdx][ySbIdx] and prediction list utilization flags predFlagLXSbCol[xSbIdx][ySbIdx] are derived as follows:
  The luma location (xSb, ySb) specifying the top-left sample of the current coding subblock relative to the top-left luma sample of the current picture is derived as follows:

xSb=xCb+xSbIdx*sbWidth+sbWidth/2 (8-551)

ySb=yCb+ySbIdx*sbHeight+sbHeight/2 (8-552)

The location (xColSb, yColSb) of the collocated subblock inside ColPic is derived as follows.
The following applies:

yColSb=Clip3(yCtb, Min(CurPicHeightInSamplesY−1,yCtb+(1«CtbLog 2SizeY)−1), ySb+(tempMv[1]»4)) (8-553)

If subpic_treated_as_pic_flag[SubPicIdx] is equal to 1, the following applies:

xColSb=Clip3(xCtb, Min(SubPicRightBoundaryPos, xCtb+(1«CtbLog 2SizeY)+3), xSb+(tempMv[0]»4)) (8-554)

Otherwise (subpic_treated_as_pic_flag[SubPicIdx] is equal to 0), the following applies:

xColSb=Clip3(xCtb, Min(CurPicWidthInSamplesY−1,xCtb+(1«CtbLog 2SizeY)+3), xSb+(tempMv[0]»4)) (8-555)

. . .
Derivation Process for Subblock-Based Temporal Merging Base Motion Data
Inputs to this process are:
the location (xCtb, yCtb) of the top-left sample of the luma coding tree block that contains the current coding block,
the location (xColCtrCb, yColCtrCb) of the top-left sample of the collocated luma coding block that covers the below-right center sample.
the availability flag availableFlagA$_1$ of the neighbouring coding unit,
the reference index refIdxLXA$_1$ of the neighbouring coding unit,
the prediction list utilization flag predFlagLXA$_1$ of the neighbouring coding unit,
the motion vector in 1/16 fractional-sample accuracy mvLXA$_1$ of the neighbouring coding unit.
Outputs of this process are:
the motion vectors ctrMvL0 and ctrMvL1,
the prediction list utilization flags ctrPredFlagL0 and ctrPredFlagL1,
the temporal motion vector tempMv.

The variable tempMv is set as follows:

tempMv[0]=0 (8-558)

tempMv[1]=0 (8-559)

The variable currPic specifies the current picture.
When availableFlagA$_1$ is equal to TRUE, the following applies:
  If all of the following conditions are true, tempMv is set equal to mvL0A$_1$:
    predFlagL0A$_1$ is equal to 1,
    DiffPicOrderCnt(ColPic, RefPicList[0][refIdxL0A$_1$]) is equal to 0,
  Otherwise, if all of the following conditions are true, tempMv is set equal to mvL1A$_1$:
    slice_type is equal to B,
    predFlagL1A$_1$ is equal to 1,
    DiffPicOrderCnt(ColPic, RefPicList[1][refIdxL1A$_1$]) is equal to 0.
The location (xColCb, yColCb) of the collocated block inside ColPic is derived as follows.
The following applies:

yColCb=Clip3(yCtb, Min(CurPicHeightInSamplesY−1,yCtb+(1«CtbLog 2SizeY)−1), yColCtrCb+(tempMv[1]»4)) (8-560)

If subpic_treated_as_pic_flag[SubPicIdx] is equal to 1, the following applies:

xColCb=Clip3(xCtb, Min(SubPicRightBoundaryPos, xCtb+(1«CtbLog 2SizeY)+3), xColCtrCb+(tempMv[0]»4)) (8-561)

Otherwise (subpic_treated_as_pic_flag[SubPicIdx] is equal to 0, the following applies:

xColCb=Clip3(xCtb, Min(CurPicWidthInSamplesY−1,xCtb+(1«CtbLog 2SizeY)+3), xColCtrCb+(tempMv[0]»4)) (8-562)

. . .
Luma Sample Interpolation Filtering Process
Inputs to this process are:
a luma location in full-sample units (xInt$_L$, yInt$_L$),
a luma location in fractional-sample units (xFrac$_L$, yFrac$_L$),
a luma location in full-sample units (xSbInt$_L$, ySbInt$_L$) specifying the top-left sample of the bounding block for reference sample padding relative to the top-left luma sample of the reference picture,
the luma reference sample array refPicLX$_L$,
the half sample interpolation filter index hpelIfIdx,
a variable sbWidth specifying the width of the current subblock,
a variable sbHeight specifying the height of the current subblock,
a luma location (xSb, ySb) specifying the top-left sample of the current subblock relative to the top-left luma sample of the current picture,
Output of this process is a predicted luma sample value predSampleLX$_L$
The variables shift1, shift2 and shift3 are derived as follows:
The variable shift1 is set equal to Min(4, BitDepth$_Y$−8), the variable shift2 is set equal to 6 and the variable shift3 is set equal to Max(2, 14−BitDepth$_Y$).
The variable picW is set equal to pic_width_in_luma_samples and the variable picH is set equal to pic_height_in_luma_samples.
The luma interpolation filter coefficients f$_L$[p] for each 1/16 fractional sample position p equal to xFrac$_L$ or yFrac$_L$ are derived as follows:
If MotionModelIdc[xSb][ySb] is greater than 0, and sbWidth and sbHeight are both equal to 4, the luma interpolation filter coefficients f$_L$[p] are specified in Table 8-12.

Otherwise, the luma interpolation filter coefficients $f_L[p]$ are specified in Table 8-11 depending on hpelIfIdx.

The luma locations in full-sample units ($xInt_i$, $yInt_i$) are derived as follows for i=0 . . . 7:

If subpic_treated_as_pic_flag[SubPicIdx] is equal to 1, the following applies:

$xInt_i$=Clip3(SubPicLeftBoundaryPos,SubPicRight-
BoundaryPos,$xInt_L$+i−3)  (8-771)

$yInt_i$=Clip3(SubPicTopBoundaryPos,SubPicBot-
BoundaryPos,$yInt_L$+i−3)  (8-772)

Otherwise (subpic_treated_as_pic_flag[SubPicIdx] is equal to 0), the following applies:

$xInt_i$=Clip3(0,pic$W$−1,sps_ref_wraparound_enabled_
flag? Clip$H$((sps_ref_wraparound_offset_mi-
nus1+1)*MinCbSize$Y$,pic$W$,$xInt_L$+i−3): $xInt_L$+i−
3)  (8-773)

$yInt_i$=Clip3(0,pic$H$−1,$yInt_L$+i−3)  (8-774)

. . .

Chroma Sample Interpolation Process
Inputs to this process are:
a chroma location in full-sample units ($xInt_C$, $yInt_C$),
a chroma location in ⅟32 fractional-sample units ($xFrac_C$, $yFrac_C$),
a chroma location in full-sample units (xSbIntC, ySbIntC) specifying the top-left sample of the bounding block for reference sample padding relative to the top-left chroma sample of the reference picture,
a variable sbWidth specifying the width of the current subblock,
a variable sbHeight specifying the height of the current subblock,
the chroma reference sample array refPicLX$_C$.
Output of this process is a predicted chroma sample value predSampleLX$_C$
The variables shift1, shift2 and shift3 are derived as follows:
The variable shift1 is set equal to Min(4, BitDepth$_C$−8), the variable shift2 is set equal to 6 and the variable shift3 is set equal to Max(2, 14−BitDepth$_C$).
The variable picW$_C$ is set equal to pic_width_in_luma_samples/SubWidthC and the variable picH$_C$ is set equal to pic_height_in_luma_samples/SubHeightC.
The chroma interpolation filter coefficients $f_C[p]$ for each ⅟32 fractional sample position p equal to $xFrac_C$ or $yFrac_C$ are specified in Table 8-13.
The variable xOffset is set equal to (sps_ref_wraparound_offset_minus1+1)*MinCbSizeY)/SubWidthC.
The chroma locations in full-sample units ($xInt_i$, $yInt_i$) are derived as follows for i=0 . . . 3:
If subpic_treated_as_pic_flag[SubPicIdx] is equal to 1, the following applies:

$xInt_i$=Clip3(SubPicLeftBoundaryPos/SubWidth$C$,
SubPicRightBoundaryPos/SubWidth$C$,$xInt_L$+i)  (8-785)

$y$Int=Clip3(SubPicTopBoundaryPos/SubHeight$C$,
SubPicBotBoundaryPos/SubHeight$C$,$yInt_L$+i)  (8-786)

Otherwise (subpic_treated_as_pic_flag[SubPicIdx] is equal to 0), the following applies:

$xInt_i$=Clip3(0,pic$W_C$−1,sps_ref_wraparound-
_enabled_flag? Clip$H$(xOffset,pic$W_C$,$xInt_C$+i−1): $xInt_C$+
i−1)  (8-787)

$yInt_i$=Clip3(0,pic$H_C$−1,$yInt_C$+i−1)  (8-788)

2.4 Example Encoder-Only GOP-Based Temporal Filter

In some embodiments, an encoder-only temporal filter can be implemented. The filtering is done at the encoder side as a pre-processing step. Source pictures before and after the selected picture to encode are read and a block based motion compensation method relative to the selected picture is applied on those source pictures. Samples in the selected picture are temporally filtered using sample values after motion compensation.

The overall filter strength is set depending on the temporal sub layer of the selected picture as well as the QP. Only pictures at temporal sub layers 0 and 1 are filtered and pictures of layer 0 are filter by a stronger filter than pictures of layer 1. The per sample filter strength is adjusted depending on the difference between the sample value in the selected picture and the co-located samples in motion compensated pictures so that small differences between a motion compensated picture and the selected picture are filtered more strongly than larger differences.

GOP Based Temporal Filter
A temporal filter is introduced directly after reading picture and before encoding. Below are the steps described in more detail.

Operation 1: Pictures are read by the encoder

Operation 2: If a picture is low enough in the coding hierarchy, it is filtered before encoding. Otherwise the picture is encoded without filtering. RA pictures with POC % 8==0 are filtered as well as LD pictures with POC % 4==0. AI pictures are never filtered.

The overall filter strength, $s_o$, is set according to the equation below for RA.

$$s_o(n) = \begin{cases} 1.5, & n \bmod 16 = 0 \\ 0.95, & n \bmod 16 \neq 0 \end{cases}$$

where n is the number of pictures read.
For the LD case, $s_o(n)$=0.95 is used.

Operation 3: Two pictures before and/or after the selected picture (referred to as original picture further down) are read. In the edge cases e.g. if is the first picture or close to the last picture, only the available pictures are read.

Operation 4: Motion of the read pictures before and after, relative to the original picture is estimated per 8×8 picture block.

Figure 2:
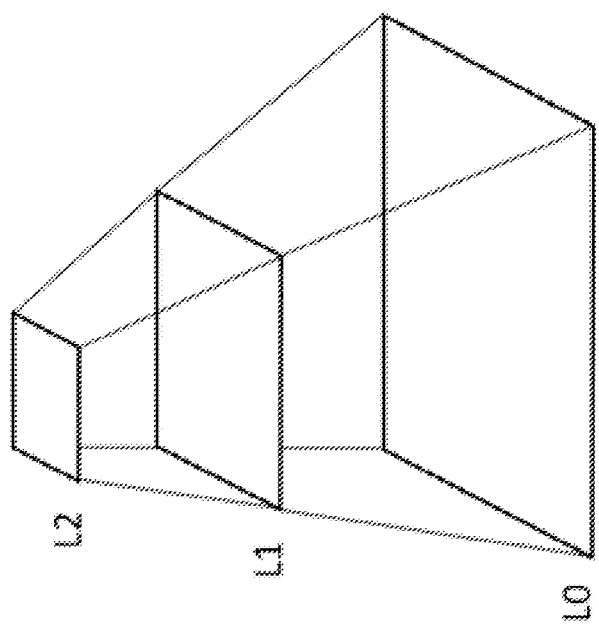
FIG. 2 shows an example of a hierarchical motion estimation scheme.

A hierarchical motion estimation scheme is used and the layers L0, L1 and L2, are illustrated in FIG. 2. Sub sampled pictures are generated by averaging each 2×2 block for all read pictures and the original picture, e.g. L1 in FIG. 1. L2 is derived from L1 using the same sub sampling method.

FIG. 2 shows examples of different layers of the hierarchical motion estimation. L0 is the original resolution. L1 is a sub sampled version of L0. L2 is a sub sampled version of L1.

First, motion estimation is done for each 16×16 block in L2. The squared difference is calculated for each selected motion vector and the motion vector corresponding to the smallest difference is selected. The selected motion vector is then used as initial value when estimating the motion in L1. Then the same is done for estimating motion in L0. As a final step, subpixel motion is estimated for each 8×8 block by using an interpolation filter on L0.

The VTM 6-tap interpolation filter can used:

| 0:  | 0, | 0,   | 64, | 0,  | 0,   | 0 |
|-----|----|------|-----|-----|------|---|
| 1:  | 1, | −3,  | 64, | 4,  | −2,  | 0 |
| 2:  | 1, | −6,  | 62, | 9,  | −3,  | 1 |
| 3:  | 2, | −8,  | 60, | 14, | −5,  | 1 |
| 4:  | 2, | −9,  | 57, | 19, | −7,  | 2 |
| 5:  | 3, | −10, | 53, | 24, | −8,  | 2 |
| 6:  | 3, | −11, | 50, | 29, | −9,  | 2 |
| 7:  | 3, | −11, | 44, | 35, | −10, | 3 |
| 8:  | 1, | −7,  | 38, | 38, | −7,  | 1 |
| 9:  | 3, | −10, | 35, | 44, | −11, | 3 |
| 10: | 2, | −9,  | 29, | 50, | −11, | 3 |
| 11: | 2, | −8,  | 24, | 53, | −10, | 3 |
| 12: | 2, | −7,  | 19, | 57, | −9,  | 2 |
| 13: | 1, | −5,  | 14, | 60, | −8,  | 2 |
| 14: | 1, | −3,  | 9,  | 62, | −6,  | 1 |
| 15: | 0, | −2,  | 4,  | 64, | −3,  | 1 |

Operation 5: Motion compensation is applied on the pictures before and after the original picture according to the best matching motion for each block, e.g., so that the sample coordinates of the original picture in each block have the best matching coordinates in the referenced pictures.

Operation 6: The samples of the processed one by one for the luma and chroma channels as described in the following steps.

Operation 7: The new sample value, $I_n$, is calculated using the following formula.

$$I_n = \frac{I_o + \sum_{i=0}^{3} w_r(i, a) I_r(i)}{1 + \sum_{i=0}^{3} w_r(i, a)}$$

Where $I_o$ is the sample value of the original sample, $I_r(i)$ is the intensity of the corresponding sample of motion compensated picture i and $w_r(i, a)$ is the weight of motion compensated picture i when the number of available motion compensated pictures is a.

In the luma channel, the weights, $w_r(i, a)$, is defined as follows:

$$w_r(i, a) = s_l s_o(n) s_r(i, a) e^{-\frac{\Delta I(i)^2}{2\sigma_l(QP)^2}}$$

Where $s_l = 0.4$ $s_r(i, 2) = \begin{cases} 1.2, & i = 0 \\ 1.0, & i = 1 \end{cases}$ $s_r(i, 4) = \begin{cases} 0.60, & i = 0 \\ 0.85, & i = 1 \\ 0.85, & i = 2 \\ 0.60, & i = 3 \end{cases}$ For all other cases of i, and a: $s_r(i, a) = 0.3$ $\sigma_l(QP) = 3 * (QP - 10)$ $\Delta I(i) = I_r(i) - I_o$ For the chroma channels, the weights, $w_r(i, a)$, is defined as follows:

$$w_r(i, a) = s_c s_o(n) s_r(i, a) e^{-\frac{\Delta I(i)^2}{2\sigma_c^2}}$$

Where $s_c = 0.55$ and $\sigma_c = 30$

Operation 8: The filter is applied for the current sample. The resulting sample value is stored separately.

Operation 9: The filtered picture is encoded.

3. Examples of Technical Problems Solved by Disclosed Embodiments (1) There are some designs that can violate the sub-picture constrain.

A. TMVP in the affine constructed candidates may fetch a MV in the collocated picture out of the range of the current sub-picture.

B. When deriving gradients in Bi-Directional Optical Flow (BDOF) and Prediction Refinement Optical Flow (PROF), two extended rows and two extended columns of integer reference samples are required to be fetched. These reference samples may be out of the range of the current sub-picture.

C. When deriving the chroma residual scaling factor in luma mapping chroma scaling (LMCS), the accessed reconstructed luma samples may be out of the range of the range of the current sub-picture.

D. The neighboring block may be out of the range of the current sub-picture, when deriving the luma intra prediction mode, reference samples for intra prediction, reference samples for CCLM, neighboring block availability for spatial neighboring candidates for merge/AMVP/CIIP/IBC/LMCS, quantization parameters, CABAC initialization process, ctxInc derivation using left and above syntax elements, and ctxInc for the syntax element mtt_split_cu_vertical_flag. The representation of subpicture may lead to subpicture with incomplete CTUs. The CTU partitions and CU splitting process may need to consider incomplete CTUs.

(2) The signaled syntax elements related to sub-picture may be arbitrarily large, which may cause an overflow problem.

(3) The representation of sub-pictures may lead to non-rectangular sub-pictures.

(4) Currently the subpicture and subpicture grid is defined in units of 4 samples. And the length of syntax element is dependent on the picture height divided by 4. However, since the current pic_width_in_luma_samples and pic_height_in_luma_samples shall be an integer multiple of Max(8, MinCbSizeY), the subpicture grid may need to be defined in units of 8 samples.

(5) The SPS syntax, pic_width_max_in_luma_samples and pic_height_max_in_luma_samples may need to be restricted to be no smaller than 8.

(6) Interaction between reference picture resampling/scalability and subpicture is not considered in the current design.

(7) In temporal filtering, samples across different sub-pictures may be required.

4. Example Techniques and Embodiments

The detailed listing below should be considered as examples to explain general concepts. These items should not be interpreted in a narrow way. Furthermore, these items can be combined in any manner. Hereinafter, temporal filter is used to represent filters that require samples in other pictures. Max(x, y) returns the larger one of x and y. Min(x, y) returns the smaller one of x and y.

1. The position (named position RB) at which a temporal MV predictor is fetched in a picture to generate affine motion candidates (e.g. a constructed affine merge candidate) must b e in a required sub-picture, assuming the top-left corner coordinate of the required sub-picture is (xTL, yTL) and bottom-right coordinate of the required sub-picture is (xBR, yBR).
   a. In one example, the required sub-picture is the sub-picture covering the current block.
   b. In one example, if position RB with a coordinate (x, y) is out of the required sub-picture, the temporal MV predictor is treated as unavailable.
      i. In one example, position RB is out of the required sub-picture if x>xBR
      ii. In one example, position RB is out of the required sub-picture if y>yBR
      iii. In one example, position RB is out of the required sub-picture if x<xTL.
      iv. In one example, position RB is out of the required sub-picture if y<yTL.
   c. In one example, position RB, if outside of the required sub-picture, a replacement of RB is utilized.
      i. Alternatively, furthermore, the replacement position shall be in the required sub-picture.
   d. In one example, position RB is clipped to be in the required sub-picture.
      i. In one example, x is clipped as x=Min(x, xBR).
      ii. In one example, y is clipped as y=Min(y, yBR).
      iii. In one example, x is clipped as x=Max(x, xTL).
      iv. In one example, y is clipped as y=Max(y, yTL).
   e. In one example, the position RB may be the bottom right position inside the corresponding block of current block in the collocated picture.
   f. The proposed method may be utilized in other coding tools which require to access motion information from a picture different than the current picture.
   g. In one example, whether the above methods are applied (e.g., position RB must be in a required sub-picture (e.g. to do as claimed in 1.a and/or 1.b)) may depend on one or more syntax elements signaled in VPS/DPS/SPS/PPS/APS/slice header/tile group header. For example, the syntax element may be subpic_treated_as_pic_flag[SubPicIdx], where SubPicIdx is the sub-picture index of sub-picture covering the current block.
2. The position (named position S) at which an integer sample is fetched in a reference not used in the interpolation process must be in a required sub-picture, assuming the top-left corner coordinate of the required sub-picture is (xTL, yTL) and the bottom-right coordinate of the required sub-picture is (xBR, yBR).
   a. In one example, the required sub-picture is the sub-picture covering the current block.
   b. In one example, if position S with a coordinate (x, y) is out of the required sub-picture, the reference sample is treated as unavailable.
      i. In one example, position S is out of the required sub-picture if x>xBR.
      ii. In one example, position S is out of the required sub-picture if y>yBR.
      iii. In one example, position S is out of the required sub-picture if x<xTL.
      iv. In one example, position S is out of the required sub-picture if y<yTL.
   c. In one example, position S is clipped to be in the required sub-picture.
      i. In one example, xis clipped as x=Min(x, xBR).
      ii. In one example, y is clipped as y=Min(y, yBR).
      iii. In one example, x is clipped as x=Max(x, xTL).
      iv. In one example, y is clipped as y=Max(y, yTL).
   d. In one example, whether position S must be in a required sub-picture (e.g. to do as claimed in 2.a and/or 2.b) may depend on one or more syntax elements signaled in VPS/DPS/SPS/PPS/APS/slice header/tile group header. For example, the syntax element may be subpic_treated_as_pic_flag[SubPicIdx], where SubPicIdx is the sub-picture index of sub-picture covering the current block.
   e. In one example, the fetched integer sample is used to generate gradients in BDOF and/or PORF.
3. The position (named position R) at which the reconstructed luma sample value is fetched may be in a required sub-picture, assuming the top-left corner coordinate of the required sub-picture is (xTL, yTL) and the bottom-right coordinate of the required sub-picture is (xBR, yBR).
   a. In one example, the required sub-picture is the sub-picture covering the current block.
   b. In one example, if position R with a coordinate (x, y) is out of the required sub-picture, the reference sample is treated as unavailable.
      i. In one example, position R is out of the required sub-picture if x>xBR.
      ii. In one example, position R is out of the required sub-picture if y>yBR.
      iii. In one example, position R is out of the required sub-picture if x<xTL.
      iv. In one example, position R is out of the required sub-picture if y<yTL.
   c. In one example, position R is clipped to be in the required sub-picture.
      i. In one example, x is clipped as x=Min(x, xBR).
      ii. In one example, y is clipped as y=Min(y, yBR).
      iii. In one example, x is clipped as x=Max(x, xTL).
      iv. In one example, y is clipped as y=Max(y, yTL).
   d. In one example, whether position R must be in a required sub-picture (e.g to do as claimed in 4.a and/or 4.b) may depend on one or more syntax elements signaled in VPS/DPS/SPS/PPS/APS/slice header/tile group header. For example, the syntax element may be subpic_treated_as_pic_flag[SubPicIdx], where SubPicIdx is the sub-picture index of sub-picture covering the current block.
   e. In one example, the fetched luma sample is used to derive the scaling factor for the chroma component(s) in LMCS.
4. The position (named position N) at which the picture boundary check for BT/TT/QT splitting, BT/TT/QT depth derivation, and/or the signaling of CU split flag must be in a required sub-picture, assuming the top-left corner coordinate of the required sub-picture is (xTL, yTL) and the bottom-right coordinate of the required sub-picture is (xBR, yBR).
   a. In one example, the required sub-picture is the sub-picture covering the current block.
   b. In one example, if position N with a coordinate (x, y) is out of the required sub-picture, the reference sample is treated as unavailable.

i. In one example, position N is out of the required sub-picture if x>xBR.
ii. In one example, position N is out of the required sub-picture if y>yBR.
iii. In one example, position N is out of the required sub-picture if x<xTL.
iv. In one example, position N is out of the required sub-picture if y<yTL.
c. In one example, position N is clipped to be in the required sub-picture.
i. In one example, x is clipped as x=Min(x, xBR).
ii. In one example, y is clipped as y=Min(y, yBR).
iii. In one example, x is clipped as x=Max(x, xTL).
d. In one example, y is clipped as y=Max(y, yTL). In one example, whether position N must be in a required sub-picture (e.g. to do as claimed in 5.a and/or 5.b) may depend on one or more syntax elements signaled in VPS/DPS/SPS/PPS/APS/slice header/tile group header. For example, the syntax element may be subpic_treated_as_pic_flag[SubPicIdx], where SubPicIdx is the sub-picture index of sub-picture covering the current block.
5. History-based Motion Vector Prediction (HMVP) table may be reset before decoding a new sub-picture in one picture.
a. In one example, the HMVP table used for IBC coding may be reset
b. In one example, the HMVP table used for inter coding may be reset
c. In one example, the HMVP table used for intra coding may be reset
6. The subpicture syntax elements may be defined in units of N (such as N=8, 32, and etc) samples.
a. In one example, the width of each element of the subpicture identifier grid in units of N samples.
b. In one example, the height of each element of the subpicture identifier grid in units of N samples.
c. In one example, N is set to the width and/or height of CTU.
7. The syntax element of picture width and picture height may be restricted to be no smaller than K (K>=8).
a. In one example, the picture width may need to be restricted to be no smaller than 8.
b. In one example, the picture height may need to be restricted to be no smaller than 8.
8. A conformance bitstream shall satisfy that sub-picture coding and Adaptive resolution conversion (ARC)/Dynamic resolution conversion (DRC)/Reference picture resampling (RPR) are disallowed to be enabled for one video unit (e.g., sequence).
a. In one example, signaling of enabling sub-picture coding may be under the conditions of disallowing ARC/DRC/RPR.
i. In one example, when subpicture is enabled, such as subpics_present_flag equal to 1, pic_width_in_luma_samples for all pictures for which this SPS is active is equal to max_width_in_luma_samples.
b. Alternatively, sub-picture coding and ARC/DRC/RPR may be both enabled for one video unit (e.g., sequence).
i. In one example, a conformance bitstream shall satisfy that the donwsampled sub-picture due to ARC/DRC/RPR shall still be in the form of K CTUs in width and M CTUs in height wherein K and M are both integers.
ii. In one example, a conformance bitstream shall satisfy that for sub-pictures not located at picture boundaries (e.g., right boundary and/or bottom boundary), the donwsampled sub-picture due to ARC/DRC/RPR shall still be in the form of K CTUs in width and M CTUs in height wherein K and M are both integers.
iii. In one example, CTU sizes may be adaptively changed based on the picture resolution.
1) In one example, a max CTU size may be signaled in SPS. For each picture with less resolution, the CTU size may be changed accordingly based on the reduced resolution.
2) In one example, CTU size may be signaled in SPS and PPS, and/or sub-picture level.
9. The syntax element subpic_grid_col_width_minus1 and subpic_grid_row_height_minus1 may be constrained.
a. In one example, subpic_grid_col_width_minus1 must be no larger (or must be smaller) than T1.
b. In one example, subpic_grid_row_height_minus1 must be no larger (or must be smaller) than T2.
c. In one example, in a conformance bit-stream, subpic_grid_col_width_minus1 and/or subpic_grid_row_height_minus1 must follow the constraint such as bullet 3.a or 3.b.
d. In one example, T1 in 3.a and/or T2 in 3.b may depend on profiles/levels/tiers of a video coding standard.
e. In one example, T1 in 3.a may depend on the picture width.
i. For example, T1 is equal to pic_width_max_in_luma_samples/4 or pic_width_max_in_luma_samples/4+Off. Off may be 1, 2, −1, −2, etc.
f. In one example, T2 in 3.b may depend on the picture width.
i. For example, T2 is equal to pic_height_max_in_luma_samples/4 or pic_height_max_in_luma_samples/4−1+Off. Off may be 1, 2, −1, −2, etc.
10. It is constrained that a boundary between two sub-pictures must be a boundary between two CTUs.
a. In other words, a CTU cannot be covered by more than one sub-picture.
b. In one example, the unit of subpic_grid_col_width_minus1 may be the CTU width (such as 32, 64, 128), instead of 4 as in VVC. The sub-picture grid width should be (subpic_grid_col_width_minus1+1)*CTU width.
c. In one example, the unit of subpic_grid_col_height_minus1 may be the CTU height (such as 32, 64, 128), instead of 4 as in VVC. The sub-picture grid height should be (subpic_grid_col_height_minus1+1) *CTU height.
d. In one example, in a conformance bit-stream, the constraint must be satisfied if the sub-picture approach is applied.
11. It is constrained that the shape of a sub-picture must be rectangular.
a. In one example, in a conformance bit-stream, the constraint must be satisfied if the sub-picture approach is applied.
b. Sub-picture may only contain rectangular slices. For example, in a conformance bit-stream, the constraint must be satisfied if the sub-picture approach is applied.

12. It is constrained that two sub-pictures cannot be overlapped.
    a. In one example, in a conformance bit-stream, the constraint must be satisfied if the sub-picture approach is applied.
    b. Alternatively, two sub-pictures may be overlapped with each other.
13. It is constrained that any position in the picture must be covered by one and only one sub-picture.
    a. In one example, in a conformance bit-stream, the constraint must be satisfied if the sub-picture approach is applied.
    b. Alternatively, one sample may not belong to any sub-picture.
    c. Alternatively, one sample may belong to more than one sub-pictures.
14. It may be constrained that sub-pictures defined in a SPS mapped to every resolution presented in the same sequence should obey the location and/or size constrained mentioned above.
    a. In one example, the width and height of a sub-picture defined in the SPS mapped to a resolution presented in the same sequence, should be integer multiple times of N (such as 8, 16, 32) luma samples.
    b. In one example, sub-pictures maybe defined for certain layer and may be mapped to other layers.
        i. For example, sub-pictures may be defined for the layer with the highest resolution in the sequence.
        ii. For example, sub-pictures may be defined for the layer with the lowest resolution in the sequence.
        iii. Which layer the sub-pictures are defined for may be signaled in SPS/VPS/PPS/slice header.
    c. In one example, when sub-pictures and different resolutions are both applied, all resolutions (e.g., width or/and height) may be integer multiple of a given resolution.
    d. In one example, the width and/or height of a sub-picture defined in the SPS may be integer multiple times (e.g., M) of the CTU size.
    e. Alternatively, sub-pictures and different resolutions in a sequence may not be allowed simultaneously.
15. Sub-pictures may only apply to a certain layer(s)
    a. In one example, sub-pictures defined in a SPS may only apply to the layer with the highest resolution in a sequence.
    b. In one example, sub-pictures defined in a SPS may only apply to the layer with the lowest temporal id in a sequence.
    c. Which layer(s) that sub-pictures may be applied to may be indicated by one or multiple syntax elements in SPS/VPS/PPS.
    d. Which layer(s) that sub-picture cannot be applied to may be indicated by one or multiple syntax elements in SPS/VPS/PPS.
16. In one example, the position and/or dimensions of a sub-picture may be signaled without using subpic_grid_idx.
    a. In one example, the top-left position of a sub-picture may be signaled.
    b. In one example, the bottom-right position of a sub-picture may be signaled.
    c. In one example, the width of sub-picture may be signaled.
    d. In one example, the height of a sub-picture may be signaled.
17. For temporal filter, when performing the temporal filtering of a sample, only samples within the same sub-picture that the current sample belongs to may be used. The required samples may be in the same picture that the current sample belongs to or in other pictures.
18. In one example, whether to and/or how to apply a partitioning method (such as QT, horizontal BT, vertical BT, horizontal TT, vertical TT, or not split, etc.) may depend on whether the current block (or partition) crosses one or multiple boundary of a sub-picture.
    a. In one example, the picture boundary handling method for partitioning in VVC may also be applied when a picture boundary is replaced by a sub-picture boundary.
    b. In one example, whether to parse a syntax element (e.g. a flag) which represents a partitioning method (such as QT, horizontal BT, vertical BT, horizontal TT, vertical TT, or not split, etc.) may depend on whether the current block (or partition) crosses one or multiple boundary of a sub-picture.
19. Instead of splitting one picture into multiple sub-pictures with independent coding of each sub-picture, it is proposed to split a picture into at least two sets of sub-regions, with the first set including multiple sub-pictures and the second set including all the remaining samples.
    a. In one example, a sample in the second set is not in any sub-pictures.
    b. Alternatively, furthermore, the second set may be encoded/decoded based on the information of the first set.
    c. In one example, a default value may be utilized to mark whether a sample/M×K sub-region belonging to the second set.
        i. In one example, the default value may be set equal to (max_subpics_minus1+K) wherein K is an integer greater than 1.
        ii. The default value may be assigned to subpic_grid_idx[i][j] to indicate that grid belongs to the second set.
20. It is proposed that the syntax element subpic_grid_idx [i][j] cannot be larger than max_subpics_minus1.
    a. For example, it is constrained that in a conformance bit-stream, subpic_grid_idx[i][j] cannot be larger than max_subpics_minus1.
    b. For example, the codeword to code subpic_grid_idx [i][j] cannot be larger than max_subpics_minus1.
21. It is proposed that, any integer number from 0 to max_subpics_minus1 must be equal to at least one subpic_grid_idx[i][j].
22. IBC virtual buffer may be reset before decoding a new sub-picture in one picture.
    a. In one example, all the samples in the IBC virtual buffer may be reset to −1.
23. Palette entry list may be reset before decoding a new sub-picture in one picture.
    a. In one example, PredictorPaletteSize may be set equal to 0 before decoding a new sub-picture in one picture.

5. Embodiments

In the following embodiments, the newly added texts are bold italicized and the deleted texts are marked by "[[ ]]".

5.1 Embodiment 1: Sub-Picture Constraint on Affine Constructed Merge Candidates 8.5.5.6 Derivation Process for Constructed Affine Control Point Motion Vector Merging Candidates Inputs to this process are:
a luma location (xCb, yCb) specifying the top-left sample of the current luma coding block relative to the top-left luma sample of the current picture,
two variables cbWidth and cbHeight specifying the width and the height of the current luma coding block,
the availability flags availableA$_0$, availableA$_1$, availableA$_2$, availableB$_0$, availableB$_1$, availableB$_2$, availableB$_3$,
the sample locations (xNbA$_0$, yNbA$_0$), (xNbA$_1$, yNbA$_1$), (xNbA$_2$, yNbA$_2$), (xNbB$_0$, yNbB$_0$), (xNbB$_1$, yNbB$_1$), (xNbB$_2$, yNbB$_2$) and (xNbB$_3$, yNbB$_3$).

Output of this process are:
the availability flag of the constructed affine control point motion vector merging candidates a vailableFlagConstK, with K=1 . . . 6,
the reference indices refIdxLXConstK, with K=1 . . . 6, X being 0 or 1,
the prediction list utilization flags predFlagLXConstK, with K=1 . . . 6, X being 0 or 1,
the affine motion model indices motionModelIdcConstK, with K=1 . . . 6,
the bi-prediction weight indices bcwIdxConstK, with K=1 . . . 6,
the constructed affine control point motion vectors cpMvLXConstK[cpIdx] with cpIdx=0 . . . 2, K=1 . . . 6 and X being 0 or 1.

. . .

The fourth (collocated bottom-right) control point motion vector cpMvLXCorner[3], reference index refIdxLXCorner[3], prediction list utilization flag predFlagLXCorner[3] and the availability flag availableFlagCorner[3] with X being 0 and 1 are derived as follows:

The reference indices for the temporal merging candidate, refIdxLXCorner[3], with X being 0 or 1, are set equal to 0.

The variables mvLXCol and availableFlagLXCol, with X being 0 or 1, are derived as follows:
If slice_temporal_mvp_enabled_flag is equal to 0, both components of mvLXCol are set equal to 0 and availableFlagLXCol is set equal to 0.
Otherwise (slice_temporal_mvp_enabled_flag is equal to 1), the following applies:

$$xColBr = xCb + cbWidth \quad (8\text{-}601)$$

$$yColBr = yCb + cbHeight \quad (8\text{-}602)$$

<u>rightBoundary Pos = subpic treated as pic flag[ SubPicIdx ]?</u>

<u>SubPic RightBoun daryPos: pic width in luma samples – 1</u>

<u>botBoundary Pos = subpic treated as pic flag [SubPicIdx]?</u>

<u>SubPic BotBoun daryPos: pic height in luma samples – 1</u>

If yCb»CtbLog 2SizeY is equal to yColBr»CtbLog 2SizeY, <u>yColBr is less than or equal to botBound aryPos and xColBr is less than or equal to rightBoun daryPos, the following applies:</u>

The variable colCb specifies the luma coding block covering the modified location given by ((xColBr»3)«3, (yColBr»3)«3) inside the collocated picture specified by ColPic.

The luma location (xColCb, yColCb) is set equal to the top-left sample of the collocated luma coding block specified by colCb relative to the top-left luma sample of the collocated picture specified by ColPic.

The derivation process for collocated motion vectors as specified in clause 8.5.2.12 is invoked with currCb, colCb, (xColCb, yColCb), refIdxLXCorner[3] and sbFlag set equal to 0 as inputs, and the output is assigned to mvLXCol and availableFlagLXCol.

Otherwise, both components of mvLXCol are set equal to 0 and availableFlagLXCol is set equal to 0.

. . .

5.2 Embodiment 2: Sub-Picture Constraint on Affine Constructed Merge Candidates 8.5.5.6 Derivation Process for Constructed Affine Control Point Motion Vector Merging Candidates Inputs to this process are:
a luma location (xCb, yCb) specifying the top-left sample of the current luma coding block relative to the top-left luma sample of the current picture,
two variables cbWidth and cbHeight specifying the width and the height of the current luma coding block,
the availability flags availableA$_0$, availableA$_1$, availableA$_2$, availableB$_0$, availableB$_1$, availableB$_2$, availableB$_3$,
the sample locations (xNbA$_0$, yNbA$_0$), (xNbA$_1$, yNbA$_1$), (xNbA$_2$, yNbA$_2$), (xNbB$_0$, yNbB$_0$), (xNbB$_1$, yNbB$_1$), (xNbB$_2$, yNbB$_2$) and (xNbB$_3$, yNbB$_3$).

Output of this process are:
the availability flag of the constructed affine control point motion vector merging candidiates availableFlagConstK, with K=1 . . . 6,
the reference indices refIdxLXConstK, with K=1 . . . 6, X being 0 or 1,
the prediction list utilization flags predFlagLXConstK, with K=1 . . . 6, X being 0 or 1,
the affine motion model indices motionModelIdcConstK, with K=1 . . . 6,
the bi-prediction weight indices bcwIdxConstK, with K=1 . . . 6,
the constructed affine control point motion vectors cpMvLXConstK[cpIdx] with cpIdx=0 . . . 2, K=1 . . . 6 and X being 0 or 1.

. . .

The fourth (collocated bottom-right) control point motion vector cpMvLXCorner[3], reference index refIdxLXCorner[3], prediction list utilization flag predFlagLXCorner[3] and the availability flag availableFlagCorner[3] with X being 0 and 1 are derived as follows:

The reference indices for the temporal merging candidate, refIdxLXCorner[3], with X being 0 or 1, are set equal to 0.

The variables mvLXCol and availableFlagLXCol, with X being 0 or 1, are derived as follows:
If slice_temporal_mvp_enabled_flag is equal to 0, both components of mvLXCol are set equal to 0 and availableFlagLXCol is set equal to 0.
Otherwise (slice_temporal_mvp_enabled_flag is equal to 1), the following applies:

$$xColBr = xCb + cbWidth \quad (8\text{-}601)$$

$$yColBr = yCb + cbHeight \quad (8\text{-}602)$$

~~rightBoundary Pos=subpic treated as pic flag[SubPicIdx]?~~

*SubPicRight BoundaryPos : pic_width_in_luma_samples − 1*

~~botBoundary Pos=subpic treated as pic flag[SubPicIdx]?~~

*SubPicBot Boundary Pos: pic_height_in_luma_samples − 1*

*xColBr = Min (rightBoundary Pos, xColBr)*

*yColBr = Min (botBoundary Pos, yColBr)*

If yCb»CtbLog 2SizeY is equal to yColBr»CtbLog 2SizeY, [[yColBr is less than pic_height_in_luma_samples and xColBr is less than pic_width_in_luma_samples, the following applies]]:
  The variable colCb specifies the luma coding block covering the modified location given by ((xColBr»3) «3, (yColBr»3)«3) inside the collocated picture specified by ColPic.
  The luma location (xColCb, yColCb) is set equal to the top-left sample of the collocated luma coding block specified by colCb relative to the top-left luma sample of the collocated picture specified by ColPic.
  The derivation process for collocated motion vectors as specified in clause 8.5.2.12 is invoked with currCb, colCb, (xColCb, yColCb), refIdxLXCorner[3] and sbFlag set equal to 0 as inputs, and the output is assigned to mvLXCol and availableFlagLXCol.
Otherwise, both components of mvLXCol are set equal to 0 and availableFlagLXCol is set equal to 0.
. . .

5.3 Embodiment 3: Fetching Integer Samples Under the Sub-Picture Constraint 8.5.6.3.3 Luma Integer Sample Fetching Process
Inputs to this process are:
a luma location in full-sample units $(xInt_L, yInt_L)$,
the luma reference sample array $refPicLX_L$,
Output of this process is a predicted luma sample value $predSampleLX_L$
The variable shift is set equal to Max(2, 14−$BitDepth_Y$).
The variable picW is set equal to pic_width_in_luma_samples and the variable picH is set equal to pic_height_in_luma_samples.
The luma locations in full-sample units (xInt, yInt) are derived as follows:

− *If subpic_treated_as_pic_flag[SubPicIdx] is equal to 1, the following applies:*

*xInt = Clip3( SubPicLeftBoundaryPos, SubPicRightBoundaryPos, xInt)*

*yInt = Clip3( SubPicTopBoundaryPos, SubPicBotBoundaryPos, yInt)*

− *Otherwise:*

$xInt = Clip3(0, picW−1, sps\_ref\_wraparound\_enabled\_flag$ ? $ClipH((sps\_ref\_wraparound\_offset\_minus1+1)*MinCbSizeY, picW, xInt_L): xInt_L)$     (8-782)

$yInt = Clip3(0, picH−1, yInt_L)$     (8-783)

The predicted luma sample value $predSampleLX_L$ is derived as follows:

$predSampleLX_L = refPicLX_L[xInt][yInt]$«shift3     (8-784)

5.4 Embodiment 4: Deriving the Variable invAvgLuma in Chroma Residual Scaling of LMCS 8.7.5.3 Picture Reconstruction with Luma Dependent Chroma Residual Scaling Process for Chroma Samples
Inputs to this process are:
a chroma location (xCurr, yCurr) of the top-left chroma sample of the current chroma transform block relative to the top-left chroma sample of the current picture,
a variable nCurrSw specifying the chroma transform block width,
a variable nCurrSh specifying the chroma transform block height,
a variable tuCbfChroma specifying the coded block flag of the current chroma transform block,
an (nCurrSw)×(nCurrSh) array predSamples specifying the chroma prediction samples of the current block,
an (nCurrSw)×(nCurrSh) array resSamples specifying the chroma residual samples of the current block,
Output of this process is a reconstructed chroma picture sample array recSamples.
The variable sizeY is set equal to Min(CtbSizeY, 64).
The reconstructed chroma picture sample recSamples is derived as follows for i=0 . . . nCurrSw−1, j=0 . . . nCurrSh−1:
. . .
Otherwise, the following applies:
. . .
  The variable currPic specifies the array of reconstructed luma samples in the current picture.
  For the derivation of the variable varScale the following ordered steps apply:
    1. The variable invAvgLuma is derived as follows:
      The array recLuma[i] with i=0 . . . (2*sizeY−1) and the variable cnt are derived as follows:
      The variable cnt is set equal to 0.
      The variable rightBoundaryPos and botBoundaryPos are derived as follows:

rightBoundaryPos=subpic_treated_as_pic_flag[SubPicIdx]? SubPicRightBoundaryPos: pic_width_in_luma_samples−1 botBoundaryPos=subpic_treated_as_pic_flag[SubPicIdx]? SubPicBotBoundaryPos: pic_height_in_luma_samples−1

When availL is equal to TRUE, the array recLuma[i] with i=0 . . . sizeY−1 is set equal to currPic[xCuCb−1][Min(yCuCb+i,[[pic_height_in_luma_samples−1]]*botBoundaryPos*)] with i=0 . . . sizeY−1, and cnt is set equal to sizeY When availT is equal to TRUE, the array recLuma [cnt+i] with i=0 . . . sizeY−1 is set equal to currPic[Min(xCuCb+i,[[pic_width_in_luma_samples−1]]*rightBoundaryPos* )][yCuCb−1] with i=0 ... sizeY−1, and cnt is set equal to (cnt+ sizeY)

The variable invAvgLuma is derived as follows:
If cnt is greater than 0, the following applies:

invAvgLuma=Clip1$_Y$(($\Sigma_{k=0}^{cnt-1}$recLuma[k]+(cnt»1))» Log 2(cnt))        (8-1013)

Otherwise (cnt is equal to 0), the following applies:

invAvgLuma=1«(BitDepth$_Y$−1)        (8-1014)

5.5 Embodiment 5: An Example of Defining the Subpicture Element in Unit of N (Such as N=8 or 32) Other than 4 Samples 7.4.3.3 Sequence Parameter Set RBSP Semantics
subpic_grid_col_width_minus1 plus 1 specifies the width of each element of the subpicture identifier grid in units of *4-N* samples. The length of the syntax element is Ceil (Log 2(pic_width_max_in_luma_samples/*4-N)* )) bits.
The variable NumSubPicGridCols is derived as follows:

NumSubPicGridCols=(pic_width_max_in_luma_samples+subpic_grid_col_width_minus1* [[4+3]] *N +N-1)* /(subpic_grid_col_width_minus1*[[4+3]] *N + N-1* )        (7-5)

subpic_grid_row_height_minus1 plus 1 specifies the height of each element of the subpicture identifier grid in units of 4 samples. The length of the syntax element is Ceil(Log 2(pic_height_max_in_luma_samples/*4-N* )) bits.
The variable NumSubPicGridRows is derived as follows:

NumSubPicGridRows=(pic_height_max_in_luma_samples+subpic_grid_row_height_minus1* *4N + N-1* )/(subpic_grid_row_height_minus1*[[4+3]] *N + N-1* )

7.4.7.1 General Slice Header Semantics
The variables SubPicIdx, SubPicLeftBoundaryPos, SubPicTopBoundaryPos, SubPicRightBoundaryPos, and SubPicBotBoundaryPos are derived as follows:

```
SubPicIdx  =  CtbToSubPicIdx[CtbAddrBsToRs[FirstCtbAddrBs[SliceBrickIdx[0]]]]
if(      subpic_treated_as_pic_flag[SubPicIdx]     )    {
  SubPicLeftBoundaryPos = SubPicLeft[SubPicIdx]*(subpic_grid_col_width_minus1 + 1)* 4 N
  SubPicRightBoundaryPos   =   ( SubPicLeft[SubPicIdx]+SubPicWidth[SubPicIdx])*
    ( subpic_grid_col_width_minus1 +1) * 4 N         (7-93)
  SubPicTopBoundaryPos = SubPicTop[SubPicIdx] * (subpic_grid_row_height_minus1 + 1)* 4 N
  SubPicBotBoundaryPos    =    ( SubPicTop[SubPicIdx]+SubPicHeight[SubPicIdx])*
    (subpic_grid_row_height_minus1 + 1) * 4 N
}
```

5.6 Embodiment 6: Restrict the Picture Width and the Picture Height to be Equal or Larger than 8

7.4.3.3 Sequence Parameter Set RBSP Semantics
pic_width_max_in_luma_samples specifies the maximum width, in units of luma samples, of each decoded picture referring to the SPS. pic_width_max_in_luma_samples shall not be equal to 0 and shall be an integer multiple of [[MinCbSizeY]] *Max(8, MinCbSizeY)*
pic_height_max_in_luma_samples specifies the maximum height, in units of luma samples, of each decoded picture referring to the SPS. pic_height_max_in_luma_samples shall not be equal to 0 and shall be an integer multiple of [[MinCbSizeY]] *Max(8, MinCbSizeY)*

5.7 Embodiment 7: Subpicture Boundary Check for BT/TT/QT Splitting, BT/TT/QT Depth Derivation, and/or the Signaling of CU Split Flag 6.4.2 Allowed Binary Split Process
The variable allowBtSplit is derived as follows:
...
Otherwise, if all of the following conditions are true, allowBtSplit is set equal to FALSE
  btSplit is equal to SPLIT_BT_VER
  y0+cbHeight is greater than [[pic_height_in_luma_samples]]*subpic_ treated_as_ pic_flag[ SubPicIdx ]? SubPicBot BoundaryPos + 1:pic_height_ in_luma_samples.*
Otherwise, if all of the following conditions are true, allowBtSplit is set equal to FALSE
  btSplit is equal to SPLIT_BT_VER
  cbHeight is greater than MaxTbSizeY
  x0+cbWidth is greater than [[pic_width_in_luma_samples]]*subpic_treated _as_pic_flag[ SubPicIdx ] ? SubPicRight BoundaryPos +1 : pic_width_in_luma_samples*
Otherwise, if all of the following conditions are true, allowBtSplit is set equal to FALSE
  btSplit is equal to SPLIT_BT_HOR
  cbWidth is greater than MaxTbSizeY
  y0+cbHeight is greater than [[pic_height_in_luma_samples]]*subpic_treated as_pic_flag[Sub PicIdx ] ? SubPicBot BoundaryPos + 1:pic_height_ in_luma_ samples.*
Otherwise, if all of the following conditions are true, allowBtSplit is set equal to FALSE
  x0+cbWidth is greater than [[pic_width_in_luma_samples]]*subpic_ treated_as pic_flag[ Sub PicIdx ] ? SubPicRight BoundaryPos+1 :pic_width_in_luma_samples*
  y0+cbHeight is greater than [[pic_height_in_luma_samples]] *subpic_treated _as_pic_flag[ SubPicIdx ]? SubPicBot BoundaryPos +1:pic_height_ in_luma_samples.*
  cbWidth is greater than minQtSize
Otherwise, if all of the following conditions are true, allowBtSplit is set equal to FALSE
  btSplit is equal to SPLIT_BT_HOR x0+cbWidth is greater than [[pic_width_in_luma_samples]] *subpic_tre ated_as_pic _flag[ Sub PicIdx ] ? SubPicRight BoundaryPos +1 :pic_width _in_luma_samples* y0+cbHeight is less than or equal to [[pic_height_in_luma_samples]] *subpic_ treated_as_ pic_flag[Sub PicIdx ]?Sub PicBotBound aryPos+1:pic_ height_in_luma_samples.*

6.4.2 Allowed Ternary Split Process

The variable allowTtSplit is derived as follows:
If one or more of the following conditions are true, allowTtSplit is set equal to FALSE:
  cbSize is less than or equal to 2*MinTtSizeY
  cbWidth is greater than Min (MaxTbSizeY, maxTtSize)
  cbHeight is greater than Min(MaxTbSizeY, maxTtSize)
  mttDepth is greater than or equal to maxMaDepth x0+cbWidth is greater than [[pic_width_in_luma_samples]] *subpic_ treated_as_:pic_flag[ SubPicIdx ] ? SubPicIdx ] ? Boundary Pos+1 :pic_width_in_luma_samples* y0+cbHeight is greater than [[pic_height_in_luma_samples]] *subpic_treated_as_pic_flag[ SubPicIdx ] ? SubPicBot BoundaryPos +1:pic_height in_luma_samples.* treeType is equal to DUAL_TREE_CHROMA and (cbWidth/SubWidthC)*(cbHeight/SubHeightC) is less than or equal to 32
  treeType is equal to DUAL_TREE_CHROMA and modeType is equal to MODE_TYPE_INTRA
Otherwise, allowTtSplit is set equal to TRUE.

7.3.8.2 Coding Tree Unit Syntax

| dual_tree_implicit_qt_split( x0, y 0, cb Size, cqtDepth) { | Descriptor |
|---|---|
| ... | |
| if( x1 <[[pic_width_in_luma_samples]]*(subpic_treated_as_pic_flag[SubPicIdx ] ? SubPicRightBoundaryPos+ 1 :pic_width _in_luma_samples)* | |
| dua l_tree_implicit_qt_split( x1 , y0, cb Size /2, cqtDepth +1) | |
| if( yl <[[pic_height_in_luma_samples]] *(subpic_treated_as_pic_flag[SubPicIdx ] ? SubPicBoBoundaryPos+ 1 :pic_height_in_luma_samples* | |
| dual_tree_implicit_qt_split( x0, yl, cb Size / 2, cqtDepth +1) | |
| if( x 1 <[[pic_width_in_luma_samples]] *((subpic_treated_as_pic_flag[SubPicIdx ] ? SubPicRightBoundaryPos+ 1 : pic_width in_luma_samples)&& y1<* | |
| [[pic_height_in_luma_ samples]]*subpic_treated_as_pic_flag[SubPicIdx ] ? SubPicBoBoundaryPos+ 1 : pic_height in_luma_samples* | |
| dual_tree_implicit_qt_split( x1 , yl, cb Size / 2, cqtDepth +1) | |
| {else { | |
| ... | |
| } | |
| } | |

7.3.8.4 Coding Tree Syntax

| coding_tree( x0, y 0, cbWidth, cbHeight, qgOnY, qgOnC, cb Subdiv, cqtDepth, mttDepth, depthOffset, partI dx, tree TypeCurr, m o de TypeCurr ) +55 | Descriptor |
|---|---|
| if( ( a llowSplitBtVer 1 1 a llowSplitBtHor 1 1 a llowSplitTtVer 1 1 a llowSplitTtHor 1 1 a llowSplitQT ) &&( x0 +cbWidth < = [[pic_width_in luma_samples]] *(subpic_treated_aspic_flag[ SubPicIdx ] ? SubPicRighBoundaryPos+1 : pic_width in_luma_samples)* && (y0 + cbHeight <= [[pic_height_in_luma_samples]] *(subpic_treated_as_pic_flag[ SubPicIdx ] ? SubPicBoBoundaryPos + 1 : pic_height_in_luma_samples* | |
| split_cu_flag | ae(v) |
| if( cu_qp_delta_enabled_flag && qgOnY && cb Subdiv <=cu_qp_delta_subdiv ) { | |
| ... | |
| depthOffset +=( y0 +cbHeight >Dic_height_in_luma samples]] *subpic_treated_as_pic_flag[SubPicIdx ] ? SubPicBotBoundaryPos + 1 : pic_height_in_luma_samples* | |
| yl =y0+(cbHeight/ 2) | |
| coding_tree( x0, y0, cbWidth, cbHeight / 2, qgOnY, qgOnC, cb Subdiv +1, cqtDepth, mttDepth+30 1, depthOffset, 0, tree Type, modeType ) | |
| if( yl <Dic_height_iniuma_samples]] *(subpic_treated_as_pic_flag[SubPicIdx ] ? SubPicBoBoundaryPos+ 1 : pic_height_in_luma_samples* | |
| coding_tree( x0, yl, cbWidth, cbHeight/2, qgOnY, qgOnC, cb Subdiv +1, cqtDepth, mttDepth+1, depthOffset, 1, tree Type, modeType ) | |
| ... | |
| if( x 1 <[[pic_width_iniuma_samples]]*(subpic_treated_as_pic_flag[SubPicIdx ] ? SubPicRightBoundaryPos + 1 : pic_width_in_luma_samples* | |
| coding_tree( x 1 , y 0, cbWidth/ 2, cbHeight / 2, qgOnY, qgOnC, cb Subdiv +2, cqtDepth+1, 0, 0, 1, tree Type, mode Type ) | |
| if( yl <[[pic_height_iniuma_samples]] *(subpic_treated_as_pic_flag[SubPicIdx]? SubPicBotBoundaryPos +1: pic_height_in_luma_samples* | |
| coding_tree( x0, yl, cbWidth/ 2, cbHeight / 2, qgOnY, qgOnC, cb Subdiv +2, cqtDepth+1, 0,0, 2, tree Type, mode Type ) | |
| if( yl <[[pic_height_in luma_samples]] *(subpic_treated_as_pic_flag[SubPicIdx ] ?* | |

-continued

```
coding_tree( x0, y 0, cbWidth, cbHeight, qgOnY, qgOnC, cb Subdiv, cqtDepth, mttDepth, depthOffset,
partI dx, tree TypeCurr, m o de TypeCurr ) +55                                                    Descriptor
    SubPicRightBoundaryPos + I: pic_width_in_luma_samples)
[[pic_width_iniuma_samples (subpic treated as_pic_flag[SubPicIdxl?
    coding_tree( x1 , y1, cbWidth/ 2, cbHeight / 2, qgOnY, qgOnC, cb Subdiv +2,
    cqtDepth+1, 0,0, 3, tree Type, mode Type )
```

Figure 3:
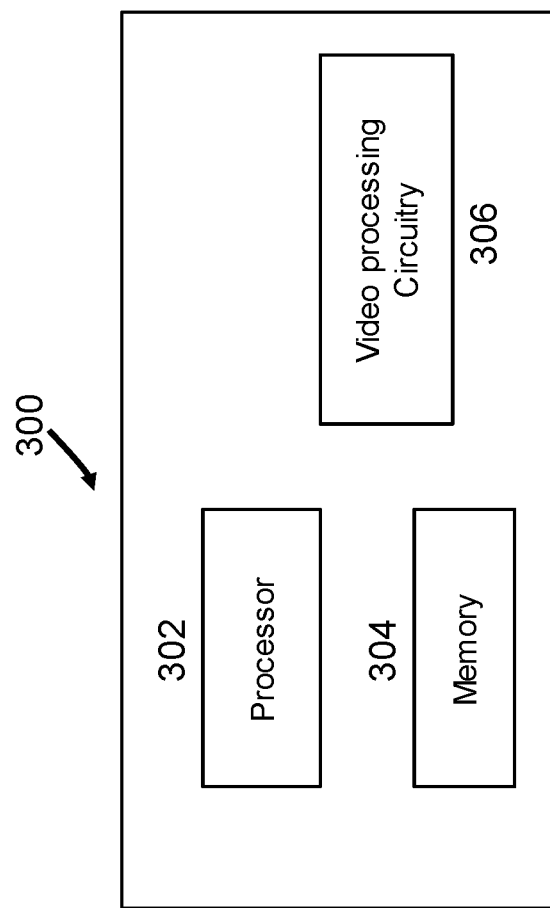
FIG. 3 is a block diagram of an example of a hardware platform used for implementing techniques described in the present document.

FIG. 3 is a block diagram of a video processing apparatus 300. The apparatus 300 may be used to implement one or more of the methods described herein. The apparatus 300 may be embodied in a smartphone, tablet, computer, Internet of Things (IoT) receiver, and so on. The apparatus 300 may include one or more processors 302, one or more memories 304 and video processing hardware 306. The processor(s) 302 may be configured to implement one or more methods described in the present document. The memory (memories) 304 may be used for storing data and code used for implementing the methods and techniques described herein. The video processing hardware 306 may be used to implement, in hardware circuitry, some techniques described in the present document.

Figure 4:
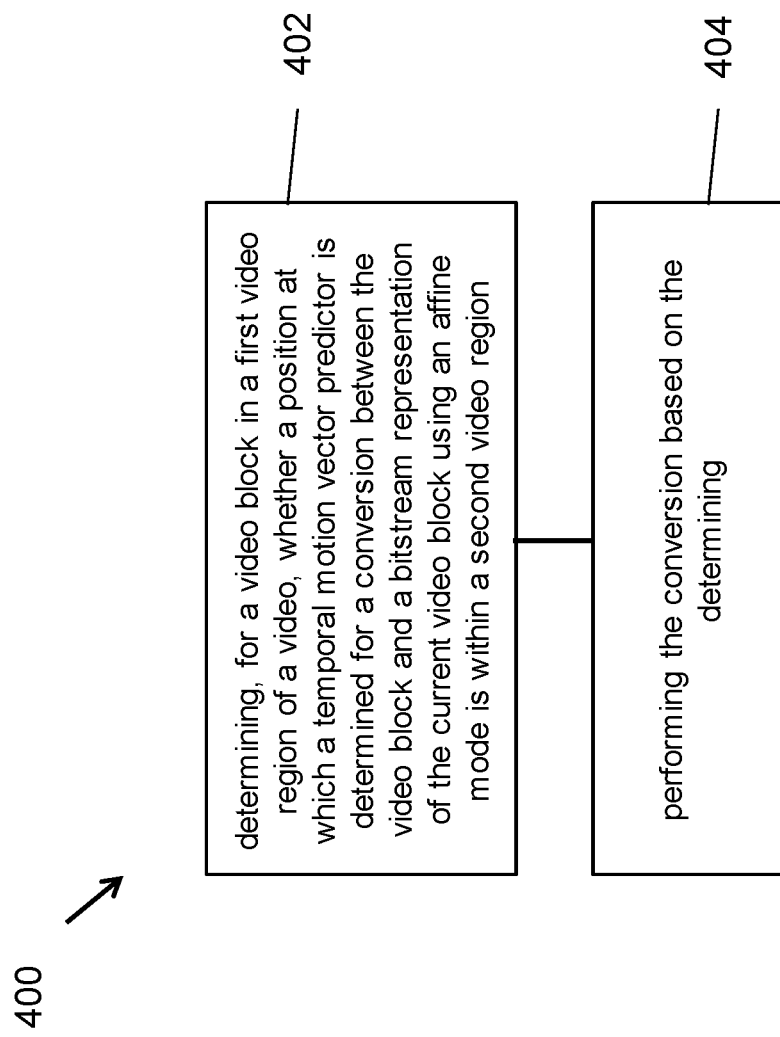
FIG. 4 is a flowchart for an example method of video processing.

FIG. 4 is a flowchart for a method 400 of processing a video. The method 1800 includes determining (402), for a video block in a first video region of a video, whether a position at which a temporal motion vector predictor is determined for a conversion between the video block and a bitstream representation of the current video block using an affine mode is within a second video region, and performing (404) the conversion based on the determining.

The following solutions may be implemented as preferred solutions in some embodiments.

The following solutions may be implemented together with additional techniques described in items listed in the previous section (e.g., item 1).

1. A method of video processing, comprising: determining, for a video block in a first video region of a video, whether a position at which a temporal motion vector predictor is determined for a conversion between the video block and a bitstream representation of the current video block using an affine mode is within a second video region; and performing the conversion based on the determining.

2. The method of solution 1, wherein the video block is covered by the first region and the second region.

3. The method of any of solutions 1-2, wherein, in case that the position of the temporal motion vector predictor is outside of the second video region, then the temporal motion vector predictor is marked as unavailable and is unused in the conversion.

The following solutions may be implemented together with additional techniques described in items listed in the previous section (e.g., item 2).

4. A method of video processing, comprising: determining, for a video block in a first video region of a video, whether a position at which an integer sample in a reference picture is fetched for a conversion between the video block and a bitstream representation of the current video block is within a second video region, wherein the reference picture is not used in an interpolation process during the conversion; and performing the conversion based on the determining.

5. The method of solution 4, wherein the video block is covered by the first region and the second region.

6. The method of any of solutions 4-5, wherein, in case that the position of the sample is outside of the second video region, then the sample is marked as unavailable and is unused in the conversion.

The following solutions may be implemented together with additional techniques described in items listed in the previous section (e.g., item 3).

7. A method of video processing, comprising: determining, for a video block in a first video region of a video, whether a position at which a reconstructed luma sample value is fetched for a conversion between the video block and a bitstream representation of the current video block is within a second video region; and performing the conversion based on the determining.

8. The method of solution 7, wherein the luma sample is covered by the first region and the second region.

9. The method of any of solutions 7-8, wherein, in case that the position of the luma sample is outside of the second video region, then the luma sample is marked as unavailable and is unused in the conversion.

The following solutions may be implemented together with additional techniques described in items listed in the previous section (e.g., item 4).

10. A method of video processing, comprising: determining, for a video block in a first video region of a video, whether a position at which a check regarding splitting, depth derivation or split flag signaling for the video block is performed during a conversion between the video block and a bitstream representation of the current video block is within a second video region; and performing the conversion based on the determining.

11. The method of solution 10, wherein the position is covered by the first region and the second region.

12. The method of any of solutions 10-11, wherein, in case that the position is outside of the second video region, then the luma sample is marked as unavailable and is unused in the conversion.

The following solutions may be implemented together with additional techniques described in items listed in the previous section (e.g., item 8).

13. A method of video processing, comprising: performing a conversion between a video comprising one or more video pictures comprising one or more video blocks, and a coded representation of the video, wherein the coded representation complies with a coding syntax requirement that the conversion is not to use sub-picture coding/decoding and a dynamic resolution conversion coding/decoding tool or a reference picture resampling tool within a video unit.

14. The method of solution 13, wherein the video unit corresponds to a sequence of the one or more video pictures.

15. The method of any of solutions 13-14, wherein the dynamic resolution conversion coding/decoding tool comprises an adaptive resolution conversion coding/decoding tool.

16. The method of any of solutions 13-14, wherein the dynamic resolution conversion coding/decoding tool comprises a dynamic resolution conversion coding/decoding tool.

17. The method of any of solutions 13-16, wherein the coded representation indicates that the video unit complies with the coding syntax requirement.

18. The method of solution 17, wherein the coded representation indicates that the video unit uses sub-picture coding.

19. The method of solution 17, wherein the coded representation indicates that the video unit uses the dynamic resolution conversion coding/decoding tool or the reference picture resampling tool.

The following solutions may be implemented together with additional techniques described in items listed in the previous section (e.g., item 10).

20. The method of any of solutions 1-19, wherein the second video region comprises a video sub-picture and wherein boundaries of the second video region and another video region is also a boundary between two coding tree units.

21. The method of any of solutions 1-19, wherein the second video region comprises a video sub-picture and wherein boundaries of the second video region and another video region is also a boundary between two coding tree units.

The following solutions may be implemented together with additional techniques described in items listed in the previous section (e.g., item 11).

22. The method of any of solutions 1-21, wherein the first video region and the second video region have rectangular shapes.

The following solutions may be implemented together with additional techniques described in items listed in the previous section (e.g., item 12).

23. The method of any of solutions 1-22, wherein the first video region and the second video region are non-overlapping.

The following solutions may be implemented together with additional techniques described in items listed in the previous section (e.g., item 13).

24. The method of any of solutions 1-23, wherein the video picture is divided into video regions such that a pixel in the video picture is covered by one and only one video region.

The following solutions may be implemented together with additional techniques described in items listed in the previous section (e.g., item 15).

25. The method of any of solutions 1-24, wherein the video picture is split into the first video region and the second video region due to the video picture being in a specific layer of the video sequence.

The following solutions may be implemented together with additional techniques described in items listed in the previous section (e.g., item 10).

26. A method of video processing, comprising: performing a conversion between a video comprising one or more video pictures comprising one or more video blocks, and a coded representation of the video, wherein the coded representation complies with a coding syntax requirement that a first syntax element subpic_grid_idx[i][j] is not larger than a second syntax element max_subpics_minus1.

27. The method of solution 26, wherein a codeword representing the first syntax element is not larger than a codeword representing the second syntax element.

28. The method of any of solutions 1-27, wherein the first video region comprises a video sub-picture.

29. The method of any of solutions 1-28, wherein the second video region comprises a video sub-picture.

30. The method of any of solutions 1 to 29, wherein the conversion comprises encoding the video into the coded representation.

31. The method of any of solutions 1 to 29, wherein the conversion comprises decoding the coded representation to generate pixel values of the video.

32. A video decoding apparatus comprising a processor configured to implement a method recited in one or more of solutions 1 to 31.

33. A video encoding apparatus comprising a processor configured to implement a method recited in one or more of solutions 1 to 31.

34. A computer program product having computer code stored thereon, the code, when executed by a processor, causes the processor to implement a method recited in any of solutions 1 to 31.

35. A method, apparatus or system described in the present document.

Figure 5:
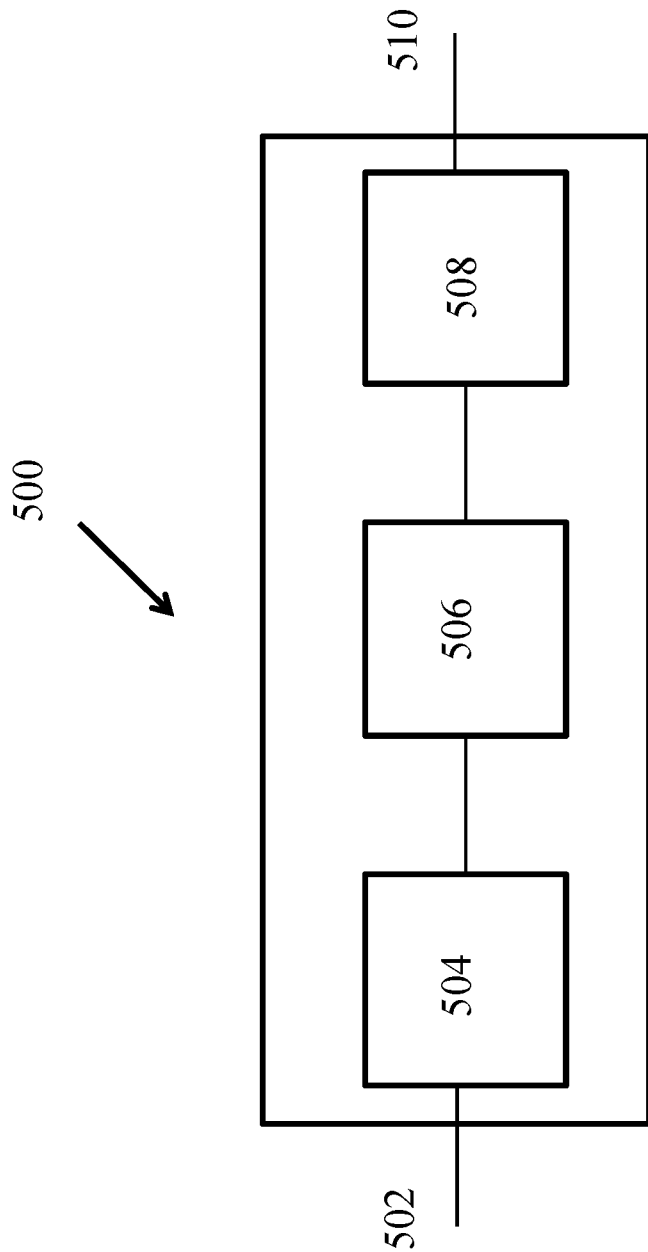
FIG. 5 is a block diagram showing an example video processing system in which various techniques disclosed herein may be implemented.

FIG. 5 is a block diagram showing an example video processing system 500 in which various techniques disclosed herein may be implemented. Various implementations may include some or all of the components of the system 500. The system 500 may include input 502 for receiving video content. The video content may be received in a raw or uncompressed format, e.g., 8 or 10 bit multi-component pixel values, or may be in a compressed or encoded format. The input 502 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 500 may include a coding component 504 that may implement the various coding or encoding methods described in the present document. The coding component 504 may reduce the average bitrate of video from the input 502 to the output of the coding component 504 to produce a coded representation of the video. The coding techniques are therefore sometimes called video compression or video transcoding techniques. The output of the coding component 504 may be either stored, or transmitted via a communication connected, as represented by the component 506. The stored or communicated bitstream (or coded) representation of the video received at the input 502 may be used by the component 508 for generating pixel values or displayable video that is sent to a display interface 510. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 6:
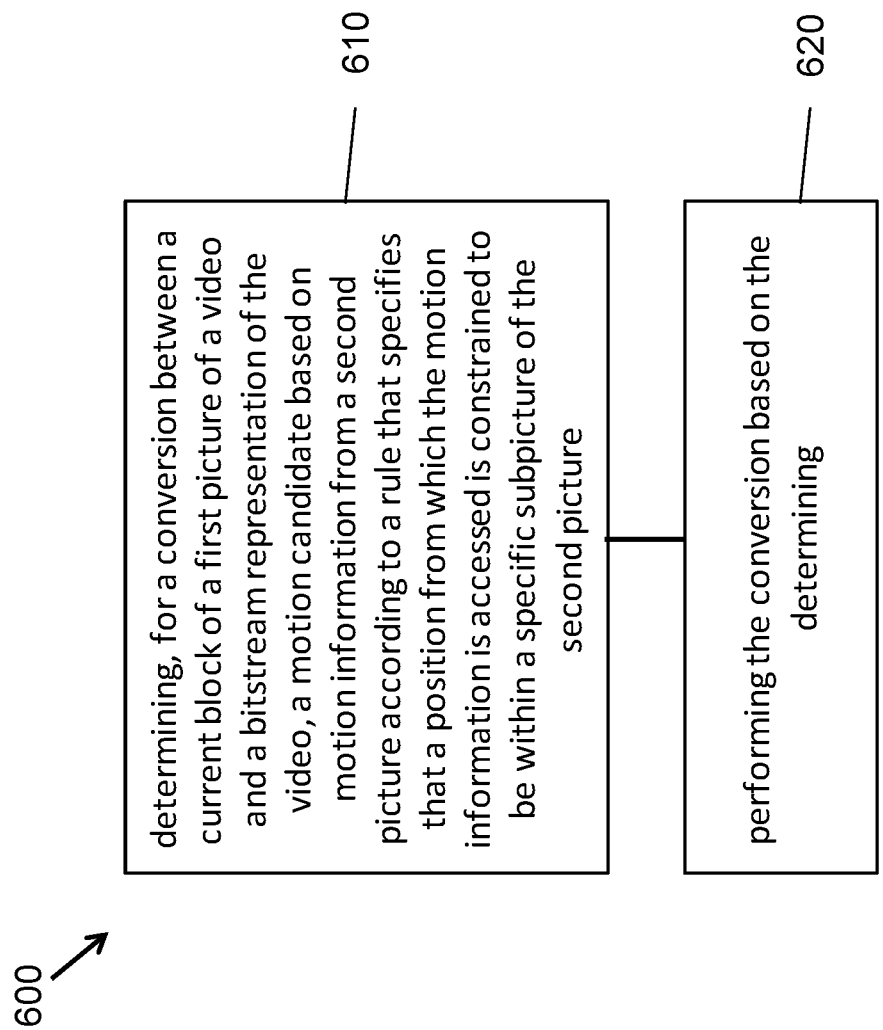
FIG. 6 is a flowchart representation of a method for video processing in accordance with the present technology.

FIG. 6 is a flowchart representation of a method 600 for video processing in accordance with the present technology. The method 600 includes, at operation 610, determining, for a conversion between a current block of a first picture of a video and a bitstream representation of the video, a motion candidate based on motion information from a second picture according to a rule. The rule specifies that a position from which the motion information is accessed is constrained to be within a specific subpicture of the second picture. The method 600 also includes at operation 620, performing the conversion based on the determining.

In some embodiments, the motion information comprises a motion vector and the motion candidate comprises an affine motion candidate. In some embodiments, the rule specifies that the position is used as a replacement for a first position in case the first position is outside of the specific subpicture. In some embodiments, the position is at a bottom-right corner of a block in the video picture that corresponds to the current block.

Figure 7:
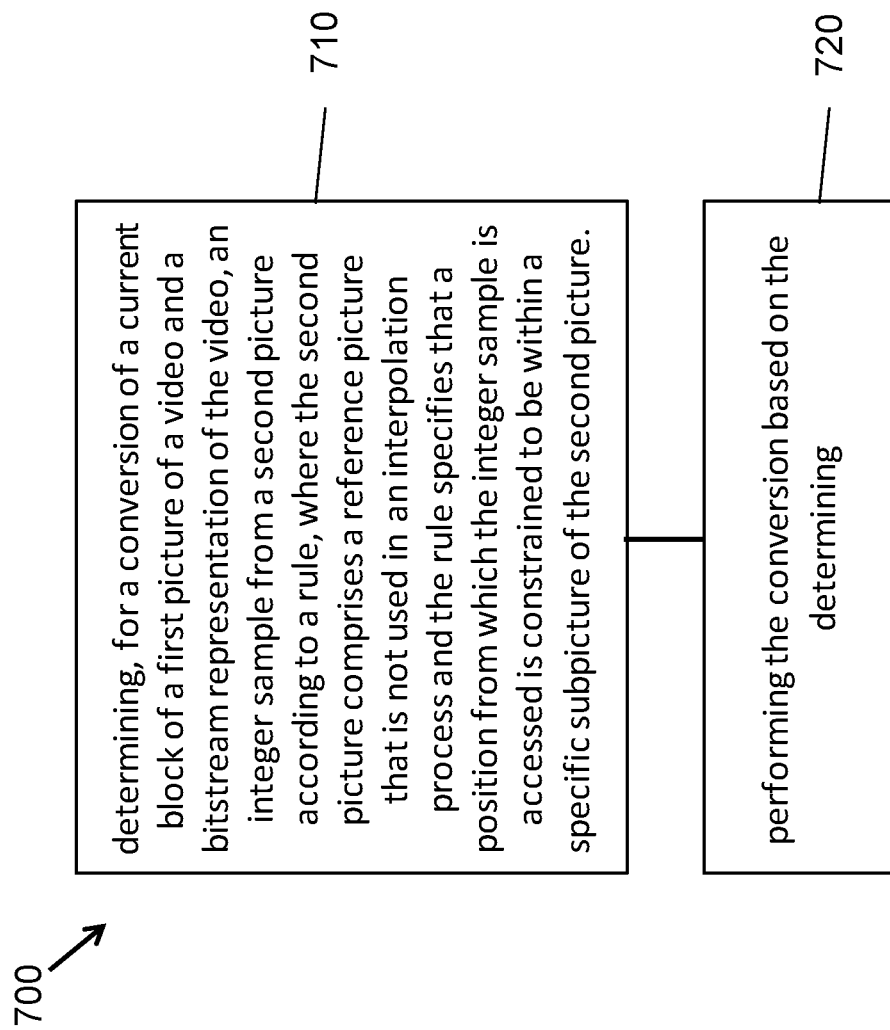
FIG. 7 is a flowchart representation of another method for video processing in accordance with the present technology.

FIG. 7 is a flowchart representation of a method 700 for video processing in accordance with the present technology. The method 700 includes, at operation 710, determining, for a conversion of a current block of a first picture of a video and a bitstream representation of the video, an integer sample from a second picture according to a rule. The second picture comprises a reference picture that is not used in an interpolation process. The rule specifies that a position from which the integer sample is accessed is constrained to be within a specific subpicture of the second picture. The method 700 also includes, at operation 720, performing the conversion based on the determining. In some embodiments, the integer sample is used to generate one or more gradients in a Bi-Directional Optical Flow or a Prediction Refinement Optical Flow process.

Figure 8:
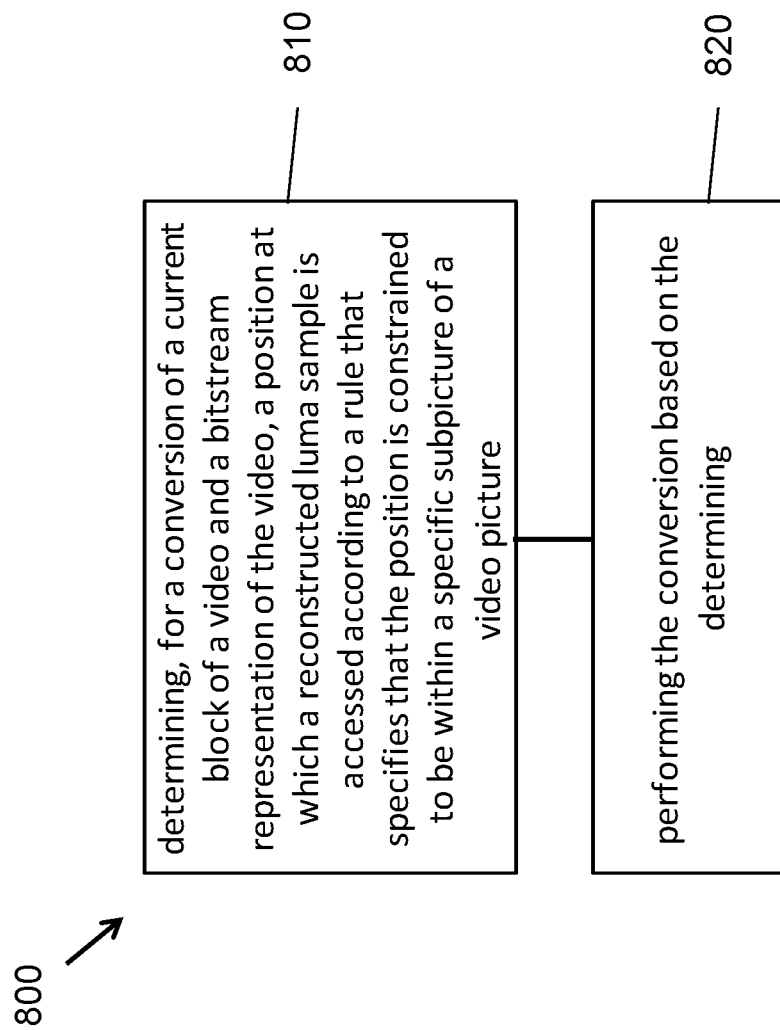
FIG. 8 is a flowchart representation of another method for video processing in accordance with the present technology.

FIG. 8 is a flowchart representation of a method 800 for video processing in accordance with the present technology. The method 800 includes, at operation 810, determining, for a conversion of a current block of a video and a bitstream representation of the video, a position at which a reconstructed luma sample is accessed according to a rule. The rule specifies that the position is constrained to be within a specific subpicture of a video picture. The method 800 also includes, at operation 820, performing the conversion based on the determining. In some embodiments, the reconstructed luma sample is accessed to derive a scaling factor for a chroma component in a luma mapping chroma scaling process.

Figure 9:
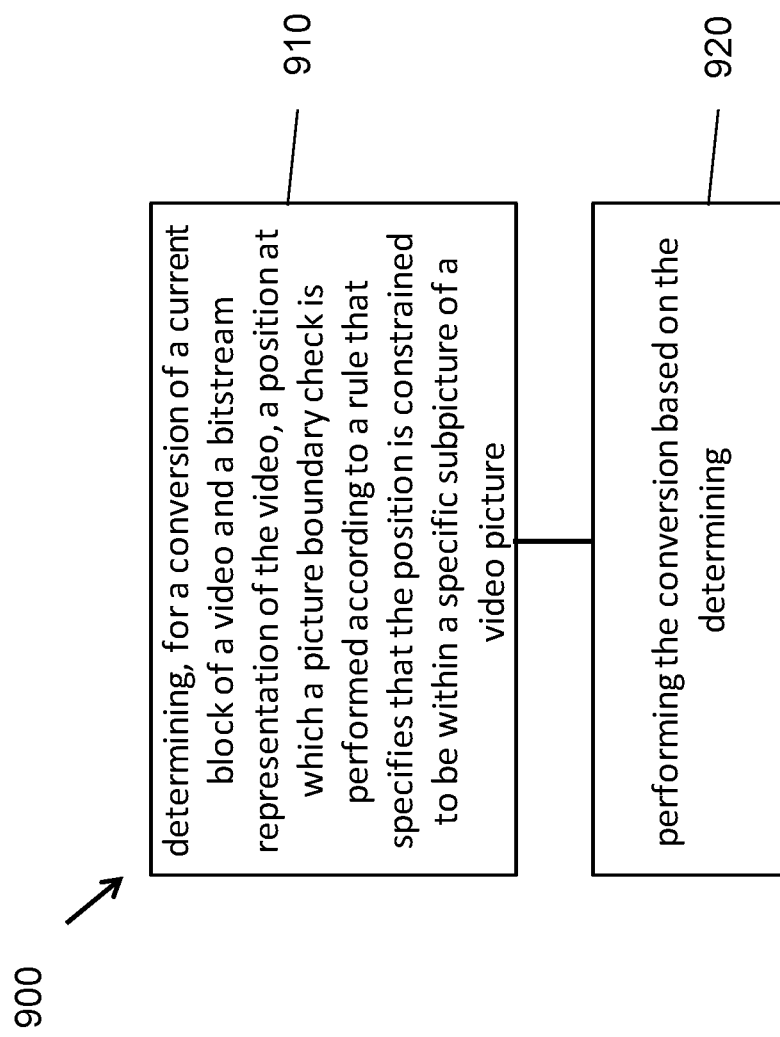
FIG. 9 is a flowchart representation of another method for video processing in accordance with the present technology.

FIG. 9 is a flowchart representation of a method 900 for video processing in accordance with the present technology. The method 900 includes, at operation 910, determining, for a conversion of a current block of a video and a bitstream representation of the video, a position at which a picture boundary check is performed according to a rule. The rule specifies that the position is constrained to be within a specific subpicture of a video picture. The method 900 also includes, at operation 920, performing the conversion based on the determining.

In some embodiments, the picture boundary check is performed for at least one of: (1) a splitting of a binary tree, a tertiary tree, or a quad tree, (2) a depth derivation for a binary tree, a tertiary tree, or a quad tree, (3) or a signaling of a split flag for the current block. In some embodiments, the specific subpicture is a collocated subpicture that covers the current block.

In some embodiments, the rule specifies that information at the position treated as unavailable in case the position is outside of a specific subpicture. The position is represented as (x, y), a top-left corner of the specific subpicture is represented as (xTL, yTL), and a bottom-right corner of the specific subpicture is represented as (xBR, yBR). In some embodiments, the position is outside of the specific subpicture in case x>xBR, y>yBR, x<xTL, or y<yTL. In some embodiments, the rule specifies that the position is clipped to be within a specific subpicture of the video picture. The position is represented as (x, y), a top-left corner of the specific subpicture is represented as (xTL, yTL), and a bottom-right corner of the specific subpicture is represented as (xBR, yBR). In some embodiments, x is clipped to be a smaller value of x and xBR. In some embodiments, y is clipped to be a smaller value of y and yBR. In some embodiments, x is clipped to be a larger value of x and xTL. In some embodiments, y is clipped to be a larger value of y and yTL.

In some embodiments, whether the rule is applicable is based on a syntax element in the bitstream representation. In some embodiments, the syntax element is signaled in a video parameter set, a dependency parameter set, a slice parameter set, a picture parameter set, an active parameter set, a slice header, or a tile group header. In some embodiments, the syntax element comprises subpic_treated_as_pic_flag[SubPicIdx], where SubPicIdx is a subpicture index of the specific sub picture that covers the current block.

In some embodiments, the conversion generates the current block from the bitstream representation. In some embodiments, the conversion generates the bitstream representation from the current block.

Figure 10:
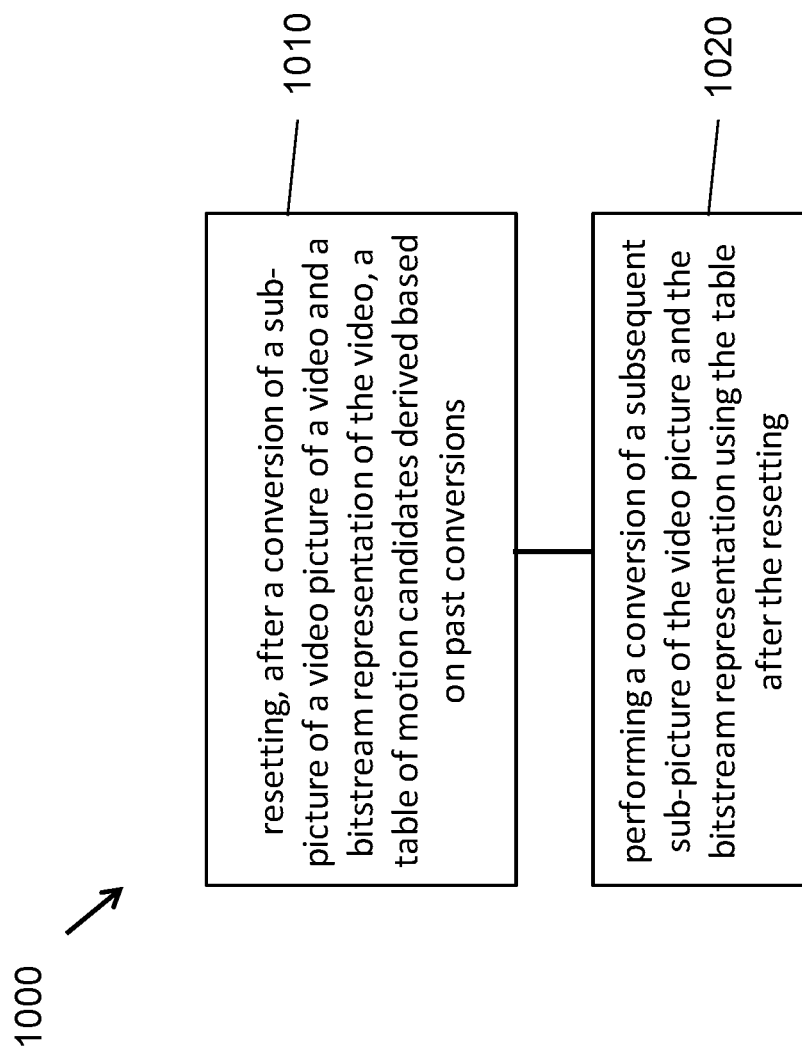
FIG. 10 is a flowchart representation of another method for video processing in accordance with the present technology.

FIG. 10 is a flowchart representation of a method 1000 for video processing in accordance with the present technology. The method 1000 includes, at operation 1010, resetting, after a conversion of a sub-picture of a video picture of a video and a bitstream representation of the video, a table of motion candidates derived based on past conversions. The method 1000 also includes, at operation 1020, performing a conversion of a subsequent sub-picture of the video picture and the bitstream representation using the table after the resetting.

In some embodiments, the table of motion candidates comprises motion candidates for an intra-block coding mode. In some embodiments, the table of motion candidates comprises motion candidates for an inter coding mode. In some embodiments, the table of motion candidates comprises motion candidates for an intra coding mode.

In some embodiments, the conversion generates the sub-picture or the subsequent sub-picture from the bitstream representation. In some embodiments, the conversion generates the bitstream representation from the sub-picture or the subsequent sub-picture.

Figure 11:
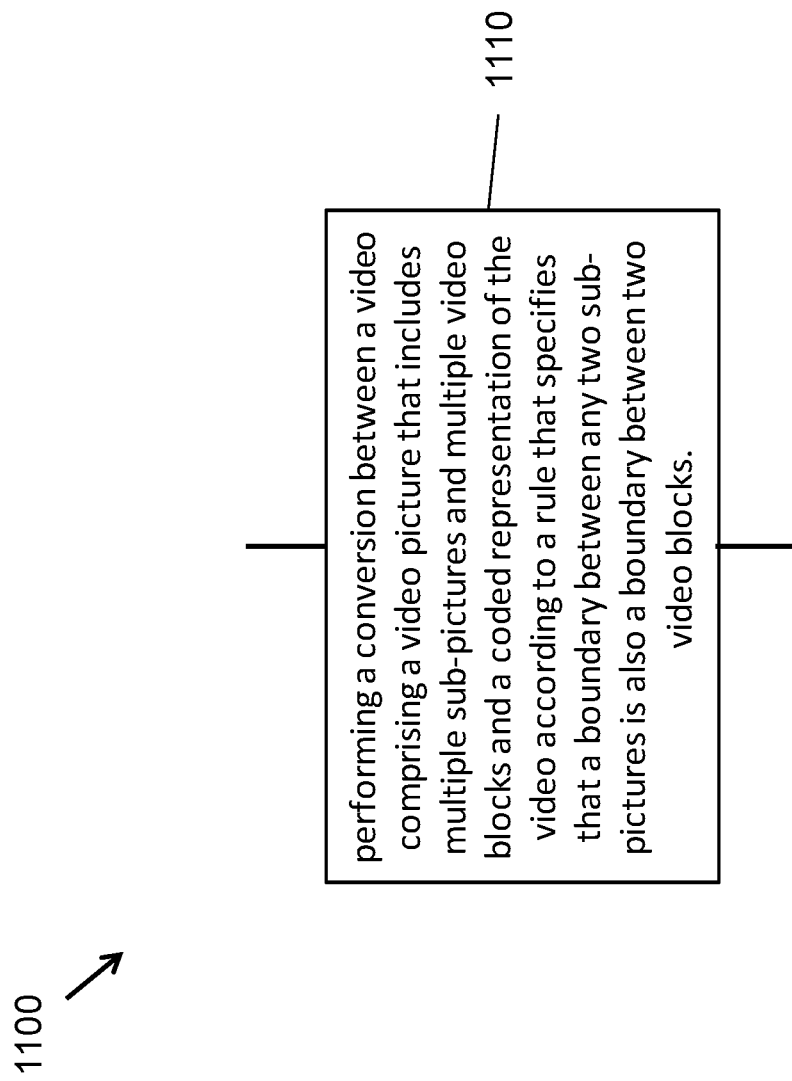
FIG. 11 is a flowchart representation of another method for video processing in accordance with the present technology.

FIG. 11 is a flowchart representation of a method 1100 for video processing in accordance with the present technology. The method 1100 includes, at operation 1110, performing a conversion between a video comprising a video picture that includes multiple sub-pictures and multiple video blocks and a coded representation of the video according to a rule. The rule specifies that a boundary between any two sub-pictures is also a boundary between two video blocks. A video block in the video picture is covered by a single subpicture of the video picture.

In some embodiments, any position in the video picture is covered by at most one subpicture of the video picture. In some embodiments, a position in the video picture is not covered by any subpicture of the video picture. In some embodiments, the two sub-pictures of the video picture have no overlapping area.

In some embodiments, a dimension of a subpicture of the video picture is determined based on a dimension of a video block. In some embodiments, a sub-picture comprises multiple elements. A syntax element indicating a width of an element in the sub-picture is represented as N samples, and a width of the sub-picture is determined based on the N samples. In some embodiments, a width of the video block comprises N samples.

In some embodiments, a sub-picture comprises multiple elements. A syntax element indicating a height of an element in the sub-picture is represented as N samples, and a height of the sub-picture is determined based on the N samples. In some embodiments, a height of the video block comprises N samples.

In some embodiments, the video block is a coding tree block (CTB) or a coding tree unit (CTU). In some embodiments, a sub-picture has a rectangular shape. In some embodiments, the sub-picture comprises rectangular slices. In some embodiments, a sub-picture is applicable to only selected one or more layers of the video. In some embodiments, the sub-picture is defined in a sequence parameter set in the bitstream representation, and the sub-picture is applicable to a layer with a highest resolution in a corresponding sequence. In some embodiments, the sub-picture is defined in a sequence parameter set in the bitstream representation, and the sub-picture is applicable to a layer with a lowest resolution in a corresponding sequence. In some embodiments, the selected one or more layers to which the sub-picture is applicable are signaled in one or more syntax elements in the bitstream representation. In some embodiments, one or more layers to which the sub-picture is inapplicable are signaled in one or more syntax elements in the bitstream representation. In some embodiments, the one or more syntax elements are signaled in a sequence parameter set, a video parameter set, or a picture parameter set in the bitstream representation.

Figure 12:
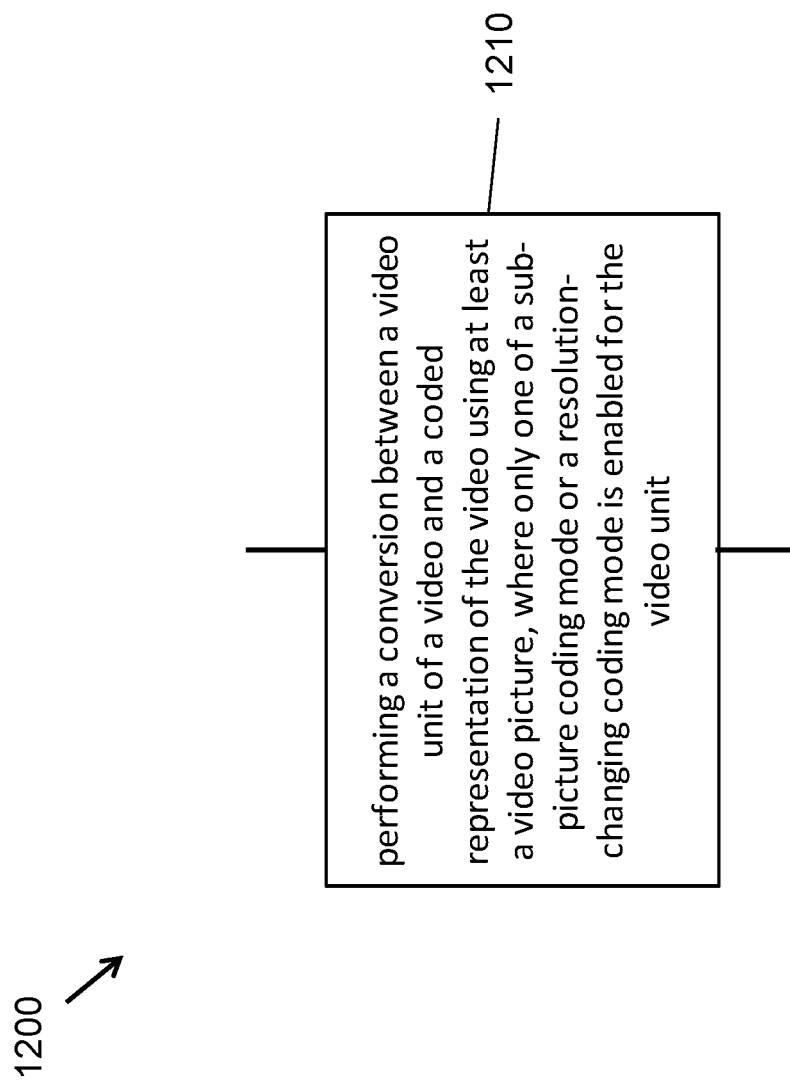
FIG. 12 is a flowchart representation of another method for video processing in accordance with the present technology.

FIG. 12 is a flowchart representation of a method 1200 for video processing in accordance with the present technology. The method 1200 includes, at operation 1210, performing a conversion between a video unit of a video and a coded representation of the video using at least a video picture, where only one of a sub-picture coding mode or a resolution-changing coding mode is enabled for the video unit. The sub-picture coding mode is a mode in which the video picture is divided into multiple sub-pictures, and the resolution-changing coding mode is a mode in which a resolution of the video picture is adjusted during the conversion.

In some embodiments, the video picture comprises a current picture or a reference picture. In some embodiments, the resolution-changing coding mode comprises a Reference Picture Resampling (PRP) mode. In some embodiments, the resolution-changing coding mode comprises a Dynamic Resolution Conversion (DRC) mode. In some embodiments, the resolution-changing coding mode comprises an Adaptive Resolution Conversion (ARC) mode.

In some embodiments, the video unit comprises a video sequence. In some embodiments, a syntax element is included in the coded representation to indicate that the sub-picture coding mode is enabled for the coding unit in case the resolution-changing coding mode is disallowed. In some embodiments, the resolution-changing coding mode is disallowed in case a syntax element is included in the coded representation to indicate that the sub-picture coding mode is enabled. In some embodiments, the syntax element comprises subpics present flag. In some embodiments, a width of the video picture is set to be equal to a maximum width allowed for video pictures in the video unit in case the syntax element indicates that the sub-picture coding mode is enabled.

Figure 13:
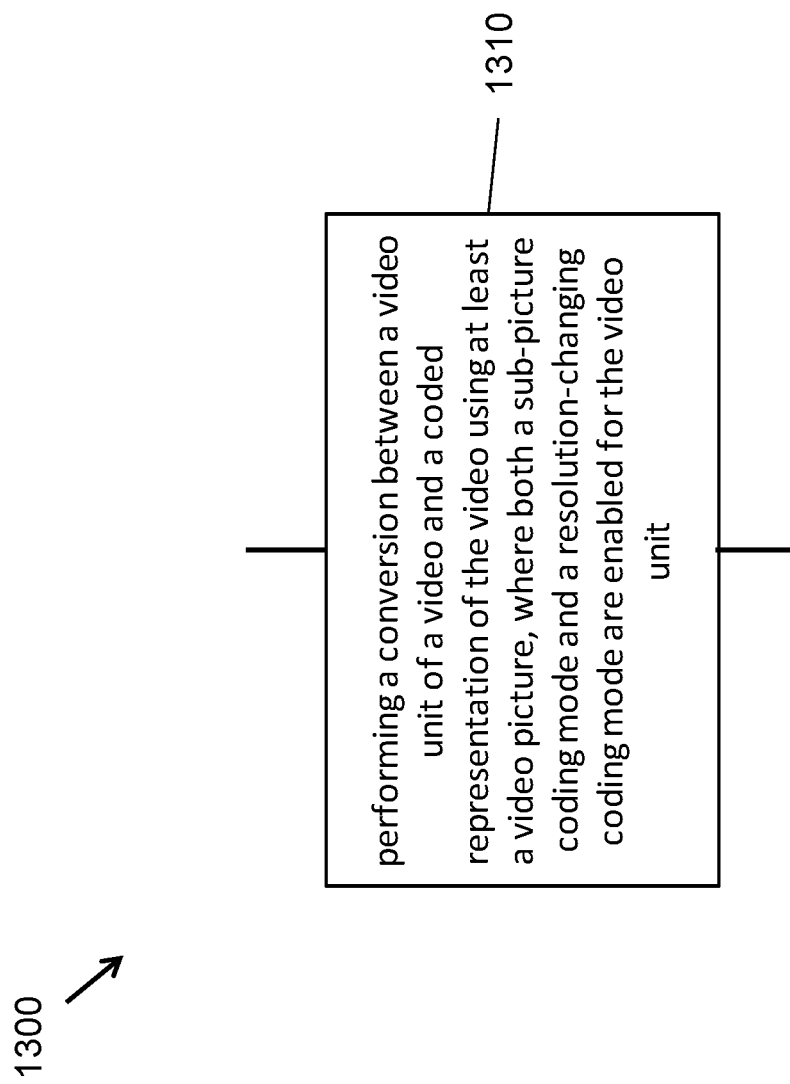
FIG. 13 is a flowchart representation of another method for video processing in accordance with the present technology.

FIG. 13 is a flowchart representation of a method 1300 for video processing in accordance with the present technology. The method 1300 includes, at operation 1310, performing a conversion between a video unit of a video and a coded representation of the video using at least a video picture, where both a sub-picture coding mode and a resolution-changing coding mode are enabled for the video unit. The sub-picture coding mode is a mode in which the video picture is divided into multiple sub-pictures, and the resolution-changing coding mode is a mode in which a resolution of the video picture is adjusted during the conversion.

In some embodiments, the video unit comprises a video sequence. In some embodiments, the resolution-changing coding mode comprises an Adaptive Resolution Conversion (ARC) mode, a Dynamic Resolution Conversion (DRC) mode, a Reference Picture Resampling (PRP) mode.

In some embodiments, the video picture includes multiple video blocks, each having a dimension of W×H. A sub-picture adjusted according to the resolution-changing coding mode has a width of K×W and a height of M×H, K and M being integers. In some embodiments, the sub-picture is not located at a boundary of the video picture. In some embodiments, the boundary comprises a right boundary or a bottom boundary.

In some embodiments, the video picture includes multiple video blocks, and a dimension of individual video blocks is adjusted based on a resolution of the video picture. In some embodiments, the coded representation comprises a syntax element indicating a maximum dimension for a video block, and the dimension of an individual video block is adjusted based on the maximum dimension and the resolution of the video picture. In some embodiments, the dimension of the individual video blocks is signaled in a sequence parameter set, a picture parameter set, or at a sub-picture level in the coded representation.

Figure 14:
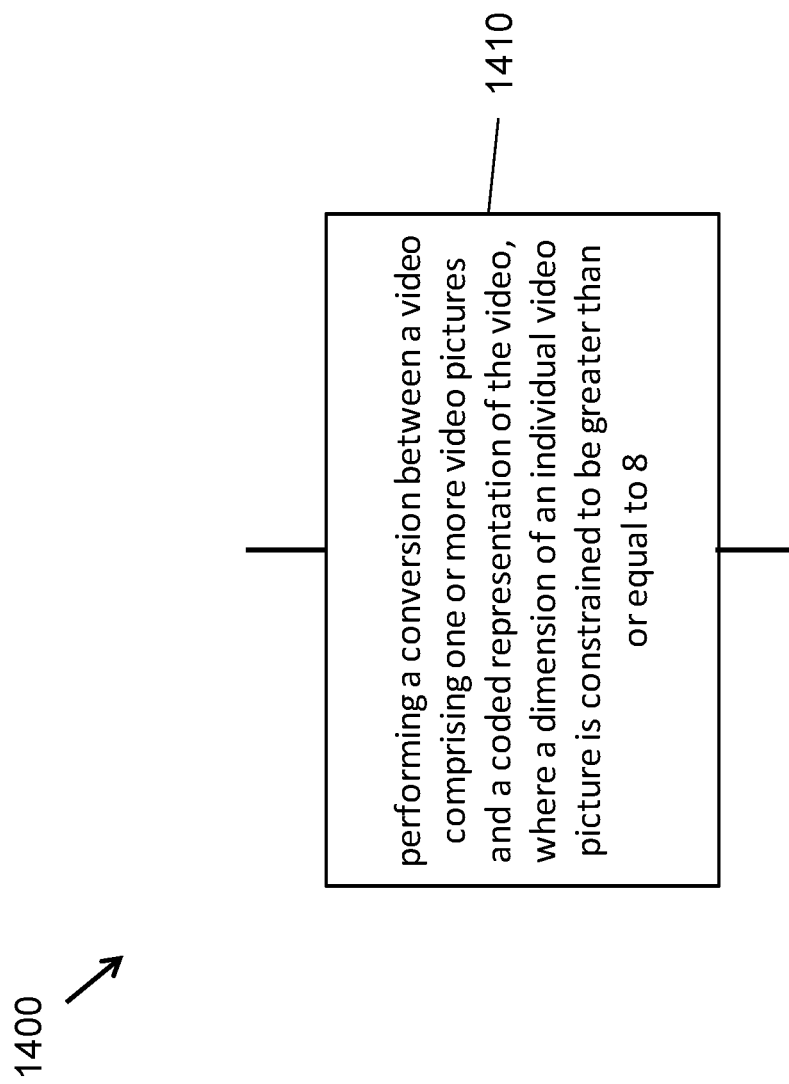
FIG. 14 is a flowchart representation of another method for video processing in accordance with the present technology.

FIG. 14 is a flowchart representation of a method 1400 for video processing in accordance with the present technology. The method 1400 includes, at operation 1410, performing a conversion between a video comprising one or more video pictures and a coded representation of the video, where a dimension of an individual video picture is constrained to be greater than or equal to 8. In some embodiments, the dimension is a width of the individual video picture. In some embodiments, the dimension is a height of the individual video picture.

Figure 15:
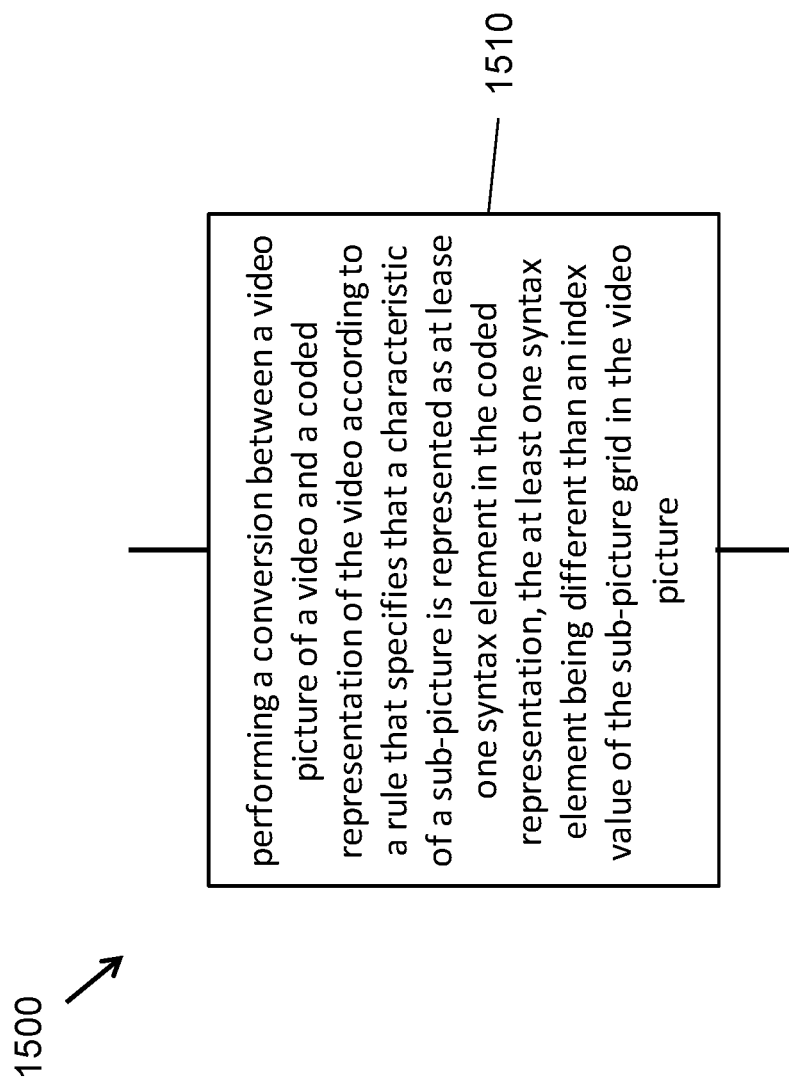
FIG. 15 is a flowchart representation of another method for video processing in accordance with the present technology.

FIG. 15 is a flowchart representation of a method 1500 for video processing in accordance with the present technology. The method 1500 includes, at operation 1510, performing a conversion between a video picture of a video and a coded representation of the video according to a rule. The video picture comprises at least one sub-picture, and the rule specifies that a characteristic of a sub-picture is represented as at lease one syntax element in the coded representation, the at least one syntax element being different than an index value of the sub-picture grid in the video picture.

In some embodiments, the characteristic comprises a top-left position of the sub-picture. In some embodiments, the characteristic comprises a bottom-right position of the sub-picture. In some embodiments, the characteristic comprises a width of the sub-picture. In some embodiments, the characteristic comprises a height of the sub-picture. In some embodiments, the index value of the sub-picture in the video picture is smaller than a maximum number of subpictures in the video picture. In some embodiments, an integer value in a range of [0, the maximum number of subpictures-1] has a one-to-one correspondence with indices values of subpictures in the video picture.

Figure 16:
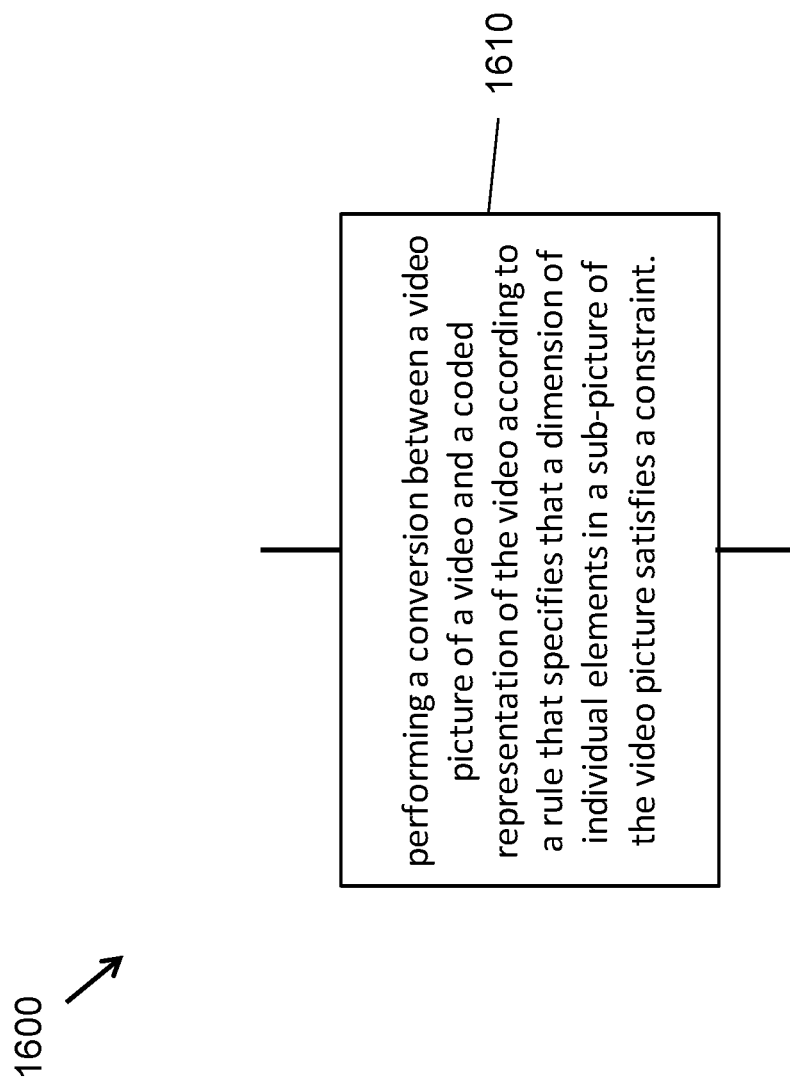
FIG. 16 is a flowchart representation of another method for video processing in accordance with the present technology.

FIG. 16 is a flowchart representation of a method 1600 for video processing in accordance with the present technology. The method 1600 includes, at operation 1610, performing a conversion between a video picture of a video and a coded representation of the video according to a rule. The video picture comprises multiple sub-pictures, each sub-picture comprising multiple elements. The rule specifies that a dimension of individual elements in a sub-picture satisfies a constraint.

In some embodiments, the constraint specifies that a width of an individual element is smaller than T1. In some embodiments, the constraint specifies that a height of an individual element is smaller than T2. In some embodiments, the video picture comprises multiple video blocks, and the constraint specifies that the sub-picture determined based on the dimension of the individual elements is covered by a current video block being processed during the conversion. In some embodiments, a sample outside of the sub-picture covered by the current video block is considered as unavailable for the conversion. In some embodiments, the constraint specifies that the dimension of the individual elements is determined based on a profile, a level, or a tier of a video coding standard. In some embodiments, the constraint specifies that the dimension of the individual elements is determined based on a width of the video picture. In some embodiments, a width of the individual elements is equal to pic_width_max_in_luma_samples/4+offset, where pic_width_max_in_luma_samples represents a maximum picturewidth in luma samples and offset is zero or a non-zero integer. In some embodiments, the constraint specifies that the dimension of the individual elements is determined based on a height of the video picture. In some embodiments, a height of the individual elements is equal to pic_height_max_in_luma_samples/4+offset, where pic_height_max_in_luma_samples represents a maximum picture height in luma samples and offset is zero or a non-zero integer.

In some embodiments, the conversion generates video picture from the bitstream representation. In some embodiments, the conversion generates the bitstream representation from the video picture.

Figure 17:
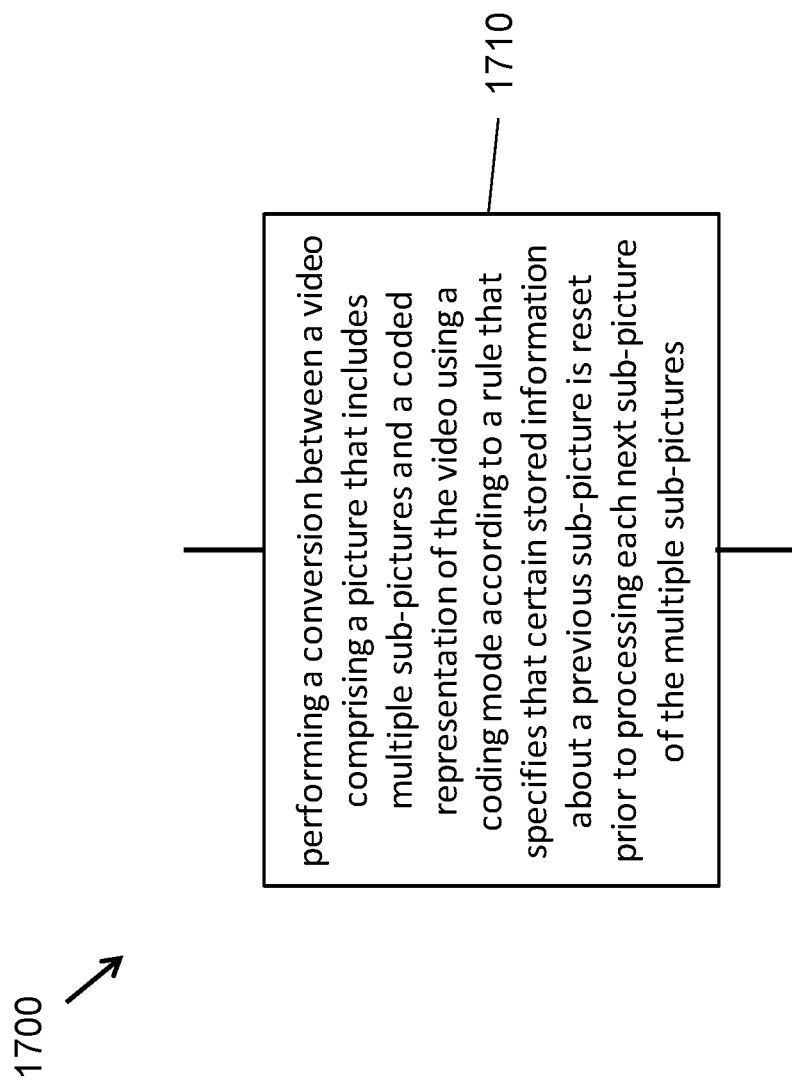
FIG. 17 is a flowchart representation of another method for video processing in accordance with the present technology.

FIG. 17 is a flowchart representation of a method 1700 for video processing in accordance with the present technology. The method 1700 includes, at operation 1710, performing a conversion between a video comprising a picture that includes multiple sub-pictures and a coded representation of the video using a coding mode according to a rule. The rule specifies that certain stored information about a previous sub-picture is reset prior to processing each next sub-picture of the multiple sub-pictures.

In some embodiments, the certain stored information comprises a virtual buffer used for an intra-block copy coding mode in which a current block in the video picture is coded with samples from the video picture. In some embodiments, the certain stored information comprises a list of entries used for a palette coding mode in which a current block in the video picture is coded using a palette of representative sample values.

Figure 18:
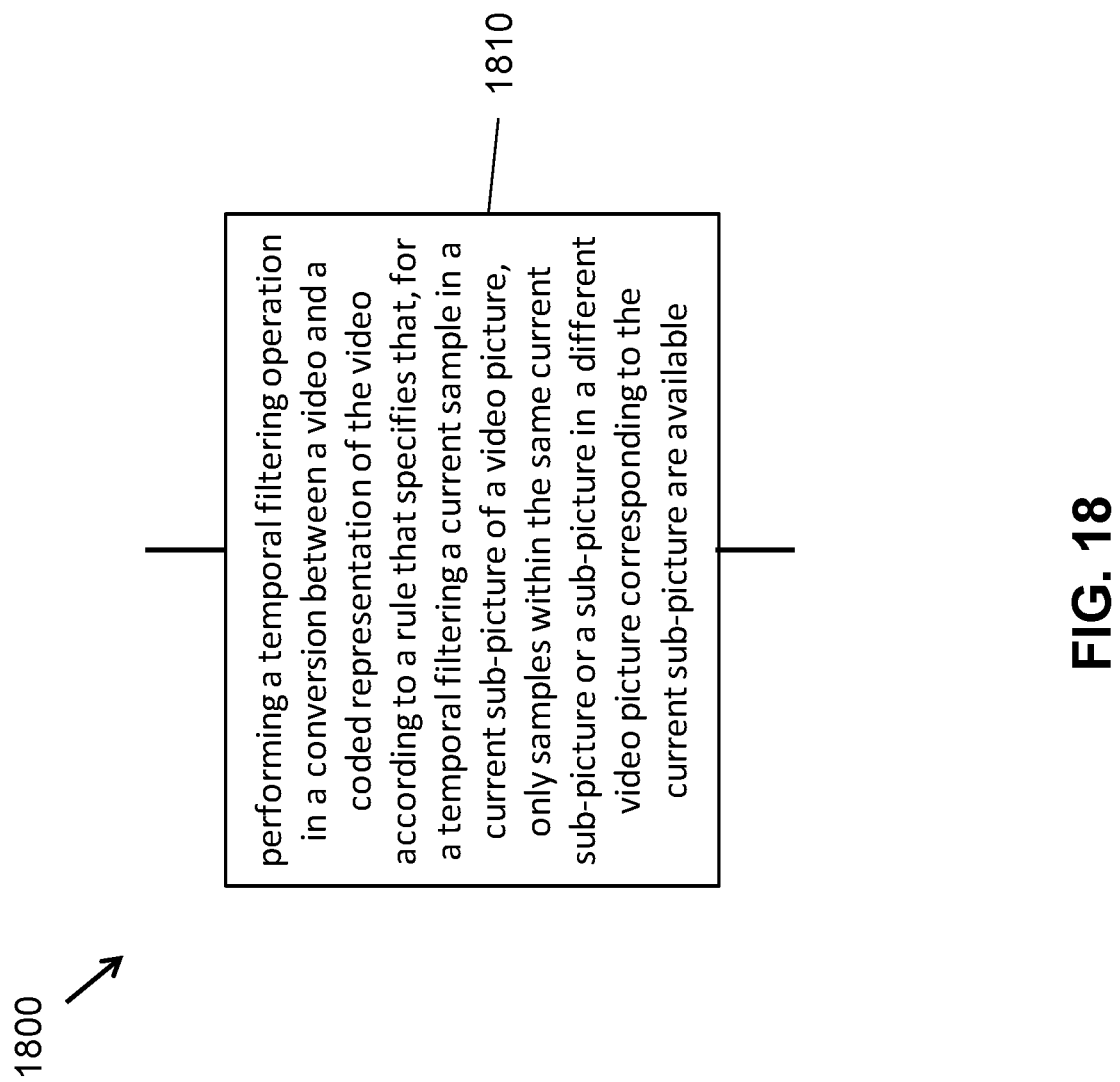
FIG. 18 is a flowchart representation of another method for video processing in accordance with the present technology.

FIG. 18 is a flowchart representation of a method 1800 for video processing in accordance with the present technology. The method 1800 includes, at operation 1810, performing a temporal filtering operation in a conversion between a video and a coded representation of the video according to a rule. The video comprises multiple video pictures, each comprising multiple sub-pictures. The rule specifies that, for a temporal filtering a current sample in a current sub-picture of a video picture, only samples within the same current sub-picture or a sub picture in a different video picture corresponding to the current sub-picture are available.

Figure 19:
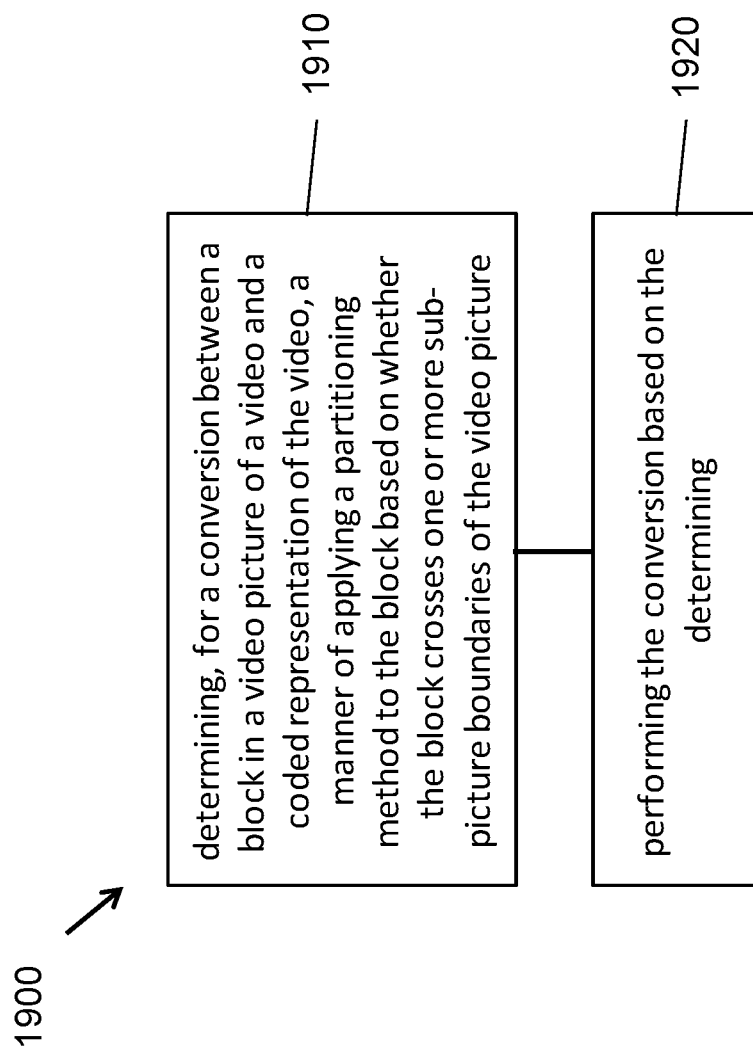
FIG. 19 is a flowchart representation of another method for video processing in accordance with the present technology.

FIG. 19 is a flowchart representation of a method 1900 for video processing in accordance with the present technology. The method 1900 includes, at operation 1910, determining, for a conversion between a block in a video picture of a video and a coded representation of the video, a manner of applying a partitioning method to the block based on whether the block crosses one or more sub-picture boundaries of the video picture. The method 1900 also includes, at operation 1920, performing the conversion based on the determining.

In some embodiments, the partitioning method comprising at least one of: a quad-tree partitioning method, a horizontal binary tree partitioning method, a vertical binary tree partitioning method, a horizontal tertiary tree partitioning method, a vertical tertiary tree partitioning method, or a no-splitting method. In some embodiments, the manner further specifies whether a boundary handling method is applicable to the block. In some embodiments, the method includes determining a manner of processing a syntax element in the coded representation indicating the partitioning method based on whether the block is located across the one or more boundaries of the sub-picture of the video picture.

Figure 20:
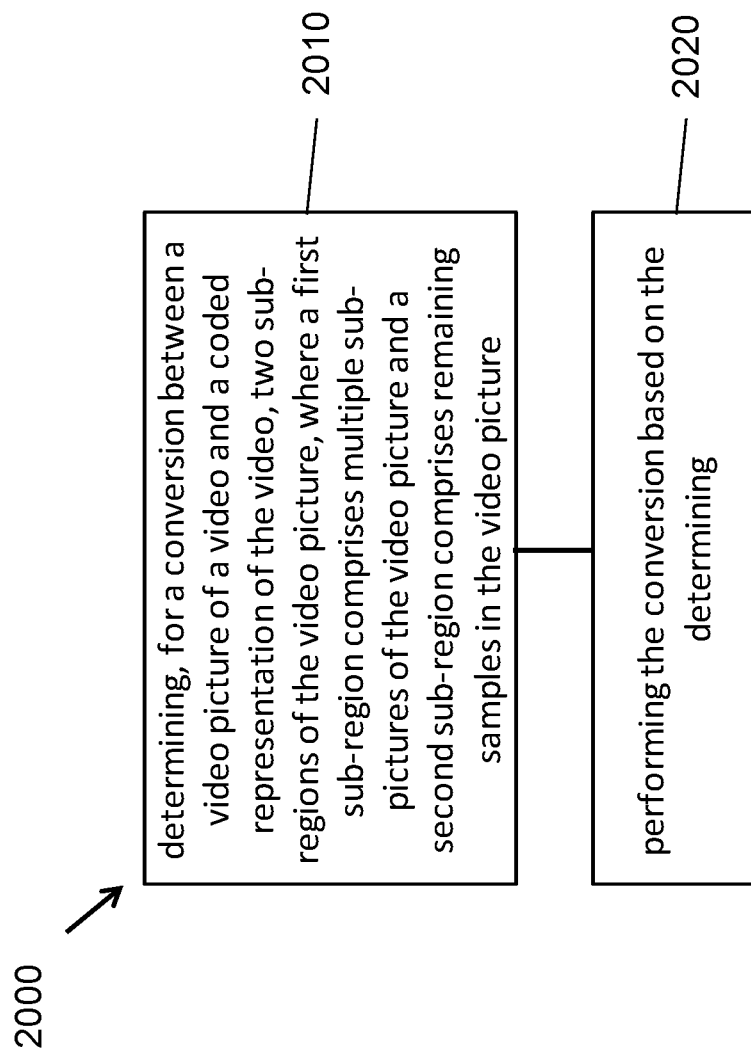
FIG. 20 is a flowchart representation of yet another method for video processing in accordance with the present technology.

FIG. 20 is a flowchart representation of a method 2000 for video processing in accordance with the present technology. The method 2000 includes, at operation 2010, determining, for a conversion between a video picture of a video and a coded representation of the video, two sub-regions of the video picture. A first sub-region comprises multiple sub-pictures of the video picture and a second sub-region comprises remaining samples in the video picture. The method 2000 also includes, at operation 2020, performing the conversion based on the determining.

In some embodiments, a sample in the second sub-region is not located in any sub-picture of the video picture. In some embodiments, the second sub-region is processed for the conversion based on information about the first sub-region. In some embodiments, a default value is used in the conversion to indicate whether a sample or an area of the video picture is located within the second sub-region. In some embodiments, the default value is set to (max_subpics_minus1+K), wherein max_subpics_minus1 indicates a maximum number of sub-pictures in the video picture, and K is an integer greater than 1. In some embodiments, the default value is assigned to each element in an array of index values representing the sub-pictures in the video picture.

In some embodiments, the conversion generates the video from the coded representation. In some embodiments, the conversion generates the coded representation from the video.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was enabled based on the decision or determination.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of processing video data, comprising:
   determining, for a conversion between a video unit of a video and a bitstream of the video, whether a resolution-changing mode is enabled for the video unit, wherein the video unit comprises one or more video pictures, and
   disabling a sub-picture coding mode for the video unit due to the determining that the resolution-changing mode is enabled for the video unit,
   wherein the sub-picture coding mode is a mode in which a video picture is divided into multiple sub-pictures, and the resolution-changing coding mode is a mode in which a spatial resolution is allowed to change between the video pictures of the video unit.

2. The method of claim 1, wherein the video unit comprises a video sequence.

3. The method of claim 1, wherein a first syntax element is included in the bitstream to indicate whether the sub-picture coding mode is enabled for the coding unit.

4. The method of claim 3, wherein in case that the resolution-changing coding mode is disabled, a width of the video picture in the video unit is set to be equal to a maximum width allowed for the video pictures in the video unit.

5. The method of claim 4, wherein a second syntax element is included in the bitstream to indicate the maximum width allowed for the video pictures in the video unit.

6. The method of claim 5, wherein a value of the second syntax element is restricted to be no smaller than 8.

7. The method of claim 5, wherein a third syntax element is included in the bitstream to indicate a maximum height allowed for the video pictures in the video unit, and a value of the third syntax element is restricted to be no smaller than 8.

8. The method of claim 1, wherein a fourth syntax element is included in the bitstream to indicate a width of a sub-picture, and a fifth syntax element is included in the bitstream to indicate a height of a sub-picture.

9. The method of claim 1, wherein a sixth syntax element is included in the bitstream to indicate a top-left position of a sub-picture.

10. The method of claim 1, wherein a position and a dimension of a sub-picture are determined excluding referring to a sub-picture identification.

11. The method of claim 1, wherein a reference picture resampling and the sub-picture coding mode are allowed to be both enabled for the video unit.

12. The method of claim 1, wherein a resolution-changing coding mode is enabled when a reference picture resampling is enabled.

13. The method of claim 1, wherein the conversion comprises encoding the video into the bitstream.

14. The method of claim 1, wherein the conversion comprises decoding the video from the bitstream.

15. An apparatus for processing video data comprising a processor and a non-transitory memory with instructions thereon, wherein the instructions upon execution by the processor, cause the processor to:
  determine, for a conversion between a video unit of a video and a bitstream of the video, whether a resolution-changing mode is enabled for the video unit, wherein the video unit comprises one or more video pictures, and
  disable a sub-picture coding mode for the video unit due to the determining that the resolution-changing mode is enabled for the video unit,
  wherein the sub-picture coding mode is a mode in which a video picture is divided into multiple sub-pictures, and the resolution-changing coding mode is a mode in which a spatial resolution is allowed to change between the video pictures of the video unit.

16. The apparatus of claim 15, wherein the video unit comprises a video sequence;
  a first syntax element is included in the bitstream to indicate whether the sub-picture coding mode is enabled for the coding unit;
  in case that the resolution-changing coding mode is disabled, a width of the video picture in the video unit is set to be equal to a maximum width allowed for the video pictures in the video unit;
  a second syntax element is included in the bitstream to indicate the maximum width allowed for the video pictures in the video unit;
  a value of the second syntax element is restricted to be no smaller than 8;
  a third syntax element is included in the bitstream to indicate a maximum height allowed for the video pictures in the video unit, and a value of the third syntax element is restricted to be no smaller than 8;
  a fourth syntax element is included in the bitstream to indicate a width of a sub-picture, and a fifth syntax element is included in the bitstream to indicate a height of a sub-picture; and
  a sixth syntax element is included in the bitstream to indicate a top-left position of a sub-picture.

17. A non-transitory computer-readable storage medium storing instructions that cause a processor to:
  determine, for a conversion between a video unit of a video and a bitstream of the video, whether a resolution-changing mode is enabled for the video unit, wherein the video unit comprises one or more video pictures, and
  disable a sub-picture coding mode for the video unit due to the determining that the resolution-changing mode is enabled for the video unit,
  wherein the sub-picture coding mode is a mode in which a video picture is divided into multiple sub-pictures, and the resolution-changing coding mode is a mode in which a spatial resolution is allowed to change between the video pictures of the video unit.

18. The non-transitory computer-readable storage medium of claim 17, wherein the video unit comprises a video sequence;
  a first syntax element is included in the bitstream to indicate whether the sub-picture coding mode is enabled for the coding unit;
  in case that the resolution-changing coding mode is disabled, a width of the video picture in the video unit is set to be equal to a maximum width allowed for the video pictures in the video unit;
  a second syntax element is included in the bitstream to indicate the maximum width allowed for the video pictures in the video unit;
  a value of the second syntax element is restricted to be no smaller than 8;
  a third syntax element is included in the bitstream to indicate a maximum height allowed for the video pictures in the video unit, and a value of the third syntax element is restricted to be no smaller than 8;
  a fourth syntax element is included in the bitstream to indicate a width of a sub-picture, and a fifth syntax element is included in the bitstream to indicate a height of a sub-picture; and
  a sixth syntax element is included in the bitstream to indicate a top-left position of a sub-picture.

19. A non-transitory computer-readable recording medium storing a bitstream of a video which is generated by a method performed by a video processing apparatus, wherein the method comprises:
  determining, for a video unit of the video, whether a resolution-changing mode is enabled for the video unit, wherein the video unit comprises one or more video pictures,
  disabling a sub-picture coding mode for the video unit due to the determining that the resolution-changing mode is enabled for the video unit, and
  generating the bitstream based on the determining,
  wherein the sub-picture coding mode is a mode in which a video picture is divided into multiple sub-pictures, and the resolution-changing coding mode is a mode in which a spatial resolution is allowed to change between the video pictures of the video unit.

20. The non-transitory computer-readable recording medium of claim 19, wherein the video unit comprises a video sequence;
- a first syntax element is included in the bitstream to indicate whether the sub-picture coding mode is enabled for the coding unit;
- in case that the resolution-changing coding mode is disabled, a width of the video picture in the video unit is set to be equal to a maximum width allowed for the video pictures in the video unit;
- a second syntax element is included in the bitstream to indicate the maximum width allowed for the video pictures in the video unit;
- a value of the second syntax element is restricted to be no smaller than 8;
- a third syntax element is included in the bitstream to indicate a maximum height allowed for the video pictures in the video unit, and a value of the third syntax element is restricted to be no smaller than 8;
- a fourth syntax element is included in the bitstream to indicate a width of a sub-picture, and a fifth syntax element is included in the bitstream to indicate a height of a sub-picture; and
- a sixth syntax element is included in the bitstream to indicate a top-left position of a sub-picture.

* * * * *